United States Patent
Mannar

(10) Patent No.: US 11,195,530 B1
(45) Date of Patent: Dec. 7, 2021

(54) VOICE ANALYSIS SYSTEMS AND METHODS FOR PROCESSING DIGITAL SOUND DATA OVER A COMMUNICATIONS NETWORK

(71) Applicant: State Farm Mutual Automobile Insurance Company, Bloomington, IL (US)

(72) Inventor: Sateesh Mannar, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 104 days.

(21) Appl. No.: 16/259,307

(22) Filed: Jan. 28, 2019

Related U.S. Application Data

(60) Provisional application No. 62/632,114, filed on Feb. 19, 2018, provisional application No. 62/656,083, filed on Apr. 11, 2018, provisional application No. 62/686,363, filed on Jun. 18, 2018.

(51) Int. Cl.
*G10L 15/26* (2006.01)
*G06Q 40/08* (2012.01)
*G06F 3/16* (2006.01)
*G06F 40/174* (2020.01)

(52) U.S. Cl.
CPC .............. *G10L 15/26* (2013.01); *G06F 3/167* (2013.01); *G06F 40/174* (2020.01); *G06Q 40/08* (2013.01)

(58) Field of Classification Search
CPC ............................... G10L 15/00; G10L 15/26
See application file for complete search history.

(56) References Cited

U.S. PATENT DOCUMENTS

| | | | |
|---|---|---|---|
| 5,231,670 A | 7/1993 | Goldhor et al. | |
| 5,619,708 A | 4/1997 | Ho | |
| 7,003,464 B2 | 2/2006 | Ferrans et al. | |
| 7,720,682 B2 | 5/2010 | Stephanick et al. | |
| 8,719,014 B2 | 5/2014 | Wagner | |
| 2001/0037287 A1* | 11/2001 | Broadbent | G06Q 20/10 705/38 |
| 2003/0154085 A1* | 8/2003 | Kelley | G06F 40/174 704/275 |
| 2006/0064302 A1 | 3/2006 | Ativanichayaphong et al. | |
| 2008/0235024 A1 | 9/2008 | Goldberg et al. | |

(Continued)

*Primary Examiner* — Matthew H Baker
(74) *Attorney, Agent, or Firm* — Armstrong Teasdale LLP

(57) ABSTRACT

A voice analysis (VA) computer system for processing verbally inputted data into online applications is provided. The VA computer system is configured to receive a first set of digital sound data in connection with a request to process an online or virtual application for an applicant, and enable a voice-input tool on a user computing device for the applicant to input registration data, the registration data included in a second set of digital sound data. The VA computer system is configured to retrieve a text-based template based upon a portion of the registration data, the text-based template including descriptor phrases and blank data fields. The VA computer system may be configured to receive the registration data as the second set of digital sound data, translate the second set of digital sound data into text inputs, and store within a database, each descriptor phrase linked to the corresponding response associated therewith.

20 Claims, 13 Drawing Sheets

(56) References Cited

U.S. PATENT DOCUMENTS

| | | | | |
|---|---|---|---|---|
| 2009/0138284 | A1* | 5/2009 | Guadagna | G16H 10/60 705/3 |
| 2010/0293108 | A1* | 11/2010 | Gurvitch | G06Q 40/04 705/36 R |
| 2013/0198104 | A1* | 8/2013 | Parker | G06Q 10/10 705/342 |
| 2015/0170638 | A1* | 6/2015 | Bezar | G10L 15/02 704/246 |
| 2015/0363725 | A1* | 12/2015 | Andersson | G06Q 10/06313 705/7.23 |
| 2016/0358603 | A1 | 12/2016 | Azam et al. | |
| 2018/0068226 | A1* | 3/2018 | O'Connor | G06F 40/35 |

\* cited by examiner

800

801 — I would like an insurance quote for my [vehicle or home]. — 802

803 — The number vehicles is __#__ and the number of drivers is __#__.
804    805    806

807 — The first driver is first middle last name.

His / Her Date of Birth is month, day, year. — 808

He / She has a driver's license from [country, state].

809 — The second driver is first middle last name.

His / Her Date of Birth is month, day, year. — 810

He / She has a driver's license from [country, state].

811 — The first vehicle is a year make model body style.

It has driven __#__ thousand miles a year. — 812

813 — The second vehicle is a year make model body style.

It has driven __#__ thousand miles a year. — 814

815 — My current insurance provider is name of insurance provider.

816 — It expires on month, day, year.

My address is line 1, line 2, city, state, zip.

| |
|---|
| I would like an insurance quote for my vehicles. |
| The number of vehicles is four and the number of drivers is two drivers. |
| The first driver is John Smith.<br><br>His / Her Date of Birth is December 12, 1970.<br><br>He / She has a driver's license from Texas. |
| The second driver is Jane Smith.<br><br>His / Her Date of Birth is January 1, 1976.<br><br>He / She has a driver's license from Texas. |
| The first vehicle is a 2015 Honda Accord LX.<br><br>It drives 10 thousand miles a year. |
| The second vehicle is a 2017 Toyota Prius Prime.<br><br>It has driven 15 thousand miles a year. |
| My current insurance provider is Tiger.<br><br>It expires on July 7th 2017. |
| My address is 1234 Main Street, Frisco, Texas, 75034. |

1001 — I would like a loan quote for a [vehicle or home]. — 1002

1003 — The price of the home is __#__ and the down payment is __#__.
     1004        1005              1006

1007 — The PMI type I would like is [Borrower-Paid PMI (BPMI), Single Premium (PMI), or Lender-Paid PMI].
                                                                          — 1008

1009 — The name of the additional applicant is first middle last name.

His / Her Date of Birth is month, day, year.

His / Her credit score is __#__.

I would like a loan quote for a home.

The price of the home is three hundred thousand dollars and the down payment is forty five thousand dollars.

The PMI type I would like is Single Premium (PMI).

1201 — I would like to submit a claim for my [vehicle or home]. — 1202

1203 — My name is first (middle) last name and my policy number is #.
       — 1204            — 1205                — 1206

1207 — The incident occurred on date and time. — 1208

1209 — The name of the first driver involved in the incident is first middle last name. — 1210
       His / Her Date of Birth is month, day, year.
       His / Her driver's license is from state.

1211 — The name of the second driver involved in the incident is first middle last name.
       His / Her Date of Birth is month, day, year.
       His / Her driver's license is from state.

I would like to submit a claim for my vehicle.

My name is John Smith and my policy number is 123456789.

The incident occurred on January 1, 2017 at 12:00 pm.

The name of the first driver involved in the incident is Jane Doe.

Her Date of Birth is April 1, 1980.

Her driver's license is from Alabama.

FIG. 13

VOICE ANALYSIS SYSTEMS AND METHODS FOR PROCESSING DIGITAL SOUND DATA OVER A COMMUNICATIONS NETWORK

CROSS-REFERENCE TO RELATED APPLICATIONS

This application claims the benefit of priority to U.S. Provisional Patent Application No. 62/632,114, filed Feb. 19, 2018, entitled "VOICE ANALYSIS SYSTEMS AND METHODS FOR PROCESSING DIGITAL SOUND DATA OVER A COMMUNICATIONS NETWORK," to U.S. Provisional Patent Application No. 62/656,083, filed Apr. 11, 2018, entitled "VOICE ANALYSIS SYSTEMS AND METHODS FOR PROCESSING DIGITAL SOUND DATA OVER A COMMUNICATIONS NETWORK," and to U.S. Provisional Patent Application No. 62/686,363, filed Jun. 18, 2018, entitled "VOICE ANALYSIS SYSTEMS AND METHODS FOR PROCESSING DIGITAL SOUND DATA OVER A COMMUNICATIONS NETWORK," the entire contents and disclosure of which are hereby incorporated by reference herein in their entirety.

FIELD OF THE INVENTION

The present disclosure relates to voice analysis and, more particularly, to systems and methods for performing voice analysis on data verbally inputted by a user as part of a registration process that is processed over a communications network.

BACKGROUND

At least some known application processing systems may require users, when registering by filling out an application, to spend time typing and/or selecting information online, either using a computing device browser or other software (e.g., computer app). This data may be inputted by the user to fill out the application. By typing and/or selecting the information, users may be prone to input incorrect information. Users must then re-initiate the application process or navigate between different web pages within the browser to correct the wrongly entered information. The re-initiation of the application process or navigation between web pages may be lengthy, especially when users input information using mobiles devices, which usually have small keyboards and processors that are not optimal for downloading and uploading massive amounts of information, such as the information used to solicit and collect data for most application processes.

Conventional application processing systems may require a great deal of data to be displayed in order to prompt a user to provide the correct type of information to complete an application being filled out by the user. Again, displaying this substantial amount of information on mobile devices may take a large amount of processing time and, in many cases, may cause a significant delay such that many users will abandon the application process. Conventional techniques may include other drawbacks as well.

BRIEF SUMMARY

In general, the present embodiments provide an improved application processing system that enables mobile devices, or other computing devices, to process applications more efficiently and display the applications promptly. As a result, users may input the requested or required data without delay, and the users may be allowed to input data verbally for a more efficient process.

More specifically, the present embodiments may relate to systems and methods for performing voice analysis on data verbally inputted by a user as part of a registration process that is processed over a communications network. A voice analysis (VA) computer system, as described herein, may include a voice analysis (VA) server and a host server. Each server includes at least one processor in communication with a memory. The VA computer system may be configured to implement various software platforms or end-user programs (e.g., computer apps) to perform voice analysis on data verbally inputted by a user as part of a registration process using an online application template. The user may be an applicant having registered or seeking registration through the VA computer system. The online application template may be associated with the registration and, more particularly, with an online application, such as an online insurance quote application, a loan quote application, and/or an insurance claim submission application (also referred to herein as an insurance claim submission application, online insurance claim submission application, online claim submission application or App), initiated by the user. The online application may be used in a graphical interface of an end-user program executed on a remote user device, such as a user computing device. The end-user program may be configured to modify metadata associated with the online application based upon data verbally inputted by the user and received from the user computing device. The end-user program may be configured to generate one or more insurance quotes, loan quotes, and/or insurance claim submissions requested by the user based upon the modified metadata.

In one aspect, a voice analysis (VA) computer system for performing voice analysis on data verbally inputted by a user as part of a registration process may be provided. The VA computer system may include a voice analysis (VA) server and a host server. Each server may include at least one processor in communication with a memory. The VA computer system may be configured to receive, from a user computing device, a first set of digital sound data in connection with a request to process an online or virtual application for an applicant, and enable a voice-input tool on the user computing device for the applicant to input registration data into the online application, wherein the registration data is included in a second set of digital sound data. The VA computer system may also be configured to retrieve a text-based template based upon a portion of the registration data. The text-based template including descriptor phrases and blank data fields, wherein each descriptor phrase is linked to a blank data field, and each descriptor phrase requests registration data from the applicant for populating the blank data fields. The VA computer system may be further configured to receive the registration data as the second set of digital sound data from the applicant via the voice-input tool. The VA computer system may be further configured to translate the second set of digital sound data into text inputs, wherein the text inputs include the descriptor phrases and responses for each blank data field, and to store within a database each descriptor phrase linked to the corresponding response associated therewith. In certain embodiments, the online application may be a virtual application for auto, homeowners, health, life, personal articles, or other types of insurance, or for vehicle, home, business, or personal loans. In alternate embodiments, the online or virtual application may be replaced with an online claim submission app that allows users to generate and submit virtual insurance claims to an insurance provider for handling. In other embodiments, the online application may be a virtual loan application, such as for a vehicle, home, business, or personal loan, and may provide terms and conditions of such loan, including an interest rate. The servers or computer system may include additional, less, or alternate functionality including that discussed elsewhere herein.

In another aspect, a computer-implemented method for performing voice analysis on data verbally inputted by a user as part of a registration process may be provided. The method may be implemented using a voice analysis (VA) computer system that includes a voice analysis (VA) server and a host server. Each server may include a processor in communication with a memory. The method may include (1) receiving, from a user computing device, a first set of digital sound data in connection with a request to process an online application for an applicant; and (2) enabling a voice-input tool on the user computing device for the applicant to input registration data into the online application, wherein the registration data is included in a second set of digital sound data. The method may also include (3) retrieving a text-based template based upon a portion of the registration data, wherein the text-based template includes descriptor phrases and blank data fields, and each descriptor phrase is linked to a blank data field, and each descriptor phrase requests registration data from the applicant for populating the blank data fields. The method may further include (4) receiving the registration data as the second set of digital sound data from the applicant via the voice-input tool; (5) translating the second set of digital sound data into text inputs, wherein the text inputs include the descriptor phrases and responses for each blank data field; and/or (6) storing within a database each descriptor phrase linked to the corresponding response associated therewith. The method may include additional, less, or alternate actions, including those discussed elsewhere herein, and may be implemented via one or more local or remote processors.

In yet another aspect, at least one non-transitory computer-readable storage media having computer-executable instructions embodied thereon may be provided. When the computer-executable instructions are executed by a voice analysis (VA) computer system that includes at least one processor in communication with a memory, the computer-executable instructions may cause the at least one processor to receive, from a user computing device, a first set of digital sound data in connection with a request to process an online application for an applicant, and enable a voice-input tool on the user computing device for the applicant to input registration data into the online application, wherein the registration data is included in a second set of digital sound data. The computer-executable instructions may also cause the at least one processor to retrieve a text-based template based upon a portion of the registration data, wherein the text-based template includes descriptor phrases and blank data fields, and each descriptor phrase is linked to a blank data field, and each descriptor phrase requests registration data from the applicant for populating the blank data fields. The computer-executable instructions may also cause the at least one processor to receive the registration data as the second set of digital sound data from the applicant via the voice-input tool. The computer-executable instructions may also cause the at least one processor to translate the second set of digital sound data into text inputs, wherein the text inputs includes the descriptor phrases and responses for each blank data field. The computer-executable instructions may further cause the at least one processor to store within a database each descriptor phrase linked to the corresponding response associated therewith. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 8 illustrates an exemplary configuration of an application template launched by the VA computer system shown in FIG. 1.

FIG. 9 illustrates another exemplary configuration of an application template launched by the VA computer system shown in FIG. 1.

FIG. 10 illustrates another exemplary configuration of an application template launched by the VA computer system shown in FIG. 1.

FIG. 11 illustrates another exemplary configuration of an application template launched by the VA computer system shown in FIG. 1.

FIG. 12 illustrates another exemplary configuration of an application template launched by the VA computer system shown in FIG. 1.

FIG. 13 illustrates another exemplary configuration of an application template launched by the VA computer system shown in FIG. 1.

Figure 1:
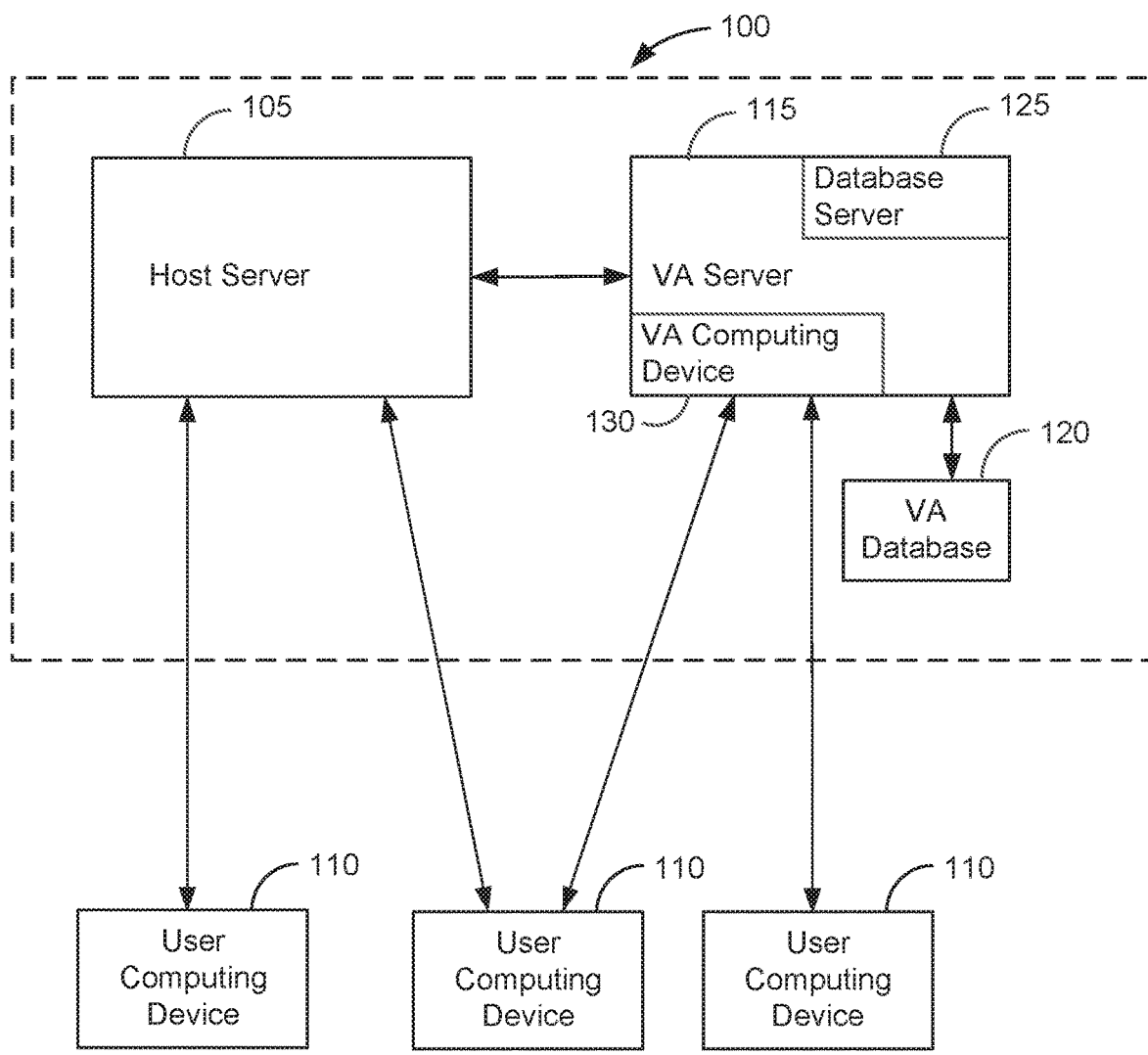
FIG. 1 illustrates a schematic diagram of an exemplary embodiment of a voice analysis (VA) computer system for processing digital sound data over a communications network.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for processing digital sound data over a communications network. In one exemplary embodiment, the process may be performed by a voice analysis (VA) computer system (also referred to herein as a "VA environment").

In the exemplary embodiment, the VA computer system may include a voice analysis (VA) server and a host server. In some embodiments, the VA computer system may include any number of VA servers and/or host servers that enables the VA computer system to function as described herein. In the exemplary embodiment, the VA server may be communicatively coupled to the host server. In other embodiments, the VA server and the host server are included in a single server.

In the exemplary embodiment, the VA computer system may be in communication with at least one user computing device associated with a user, such as an applicant having registered or seeking registration through the VA computer system. More specifically, the VA server and the host server are each in communication with the at least one user computing device. The VA server may include at least one voice analysis (VA) computing device. The VA server may also include at least one processor in communication with a memory (also referred to herein as voice analysis (VA) database). In some embodiments, the memory may include one or more storage devices, including cloud storage devices, internal memory devices, non-centralized databases, and/or combinations thereof.

In the exemplary embodiment, the user computing device includes at least one processor in communication with a memory. The user computing device may further include any device capable of accessing the Internet including, but is not limited to, a desktop computer, a mobile computing device, such as a laptop computer, a personal digital assistant (PDA), a cellular phone, a smartphone, smart glasses, smart watch, wearable, a tablet, or a phablet, or other web-based connectable equipment. In the exemplary embodiment, the user computing device may be a mobile computing device or mobile device. As discussed herein, mobile devices may pose some challenges for entering data into known application systems because of the lack of full keyboards and/or pointer devices. The VA computer system described herein addresses those challenges.

In the exemplary embodiment, the VA server may be configured to process digital sound data associated with verbal input of data into applications, such as verbal input data into an insurance application for providing policy quotes, over a communications network. More specifically, the VA server may include one or more translation modules configured to process and/or convert the digital sound data of the applicant into text, and populate blank data fields within the VA database using said text. In some embodiments, the one or more translation modules may be included in the at least one VA computing device. The digital sound data may include at least applicant's voice parameters (e.g., a first set of digital sound data) provided in response to a test calibration phrase, and registration data (e.g., a second set of digital sound data) provided in response to the online application as described in more detail below. In certain embodiments, the online application may be a virtual insurance application for vehicle/auto, homeowners, health, life, personal articles, or other types of insurance that provides a quote or a usage-based insurance quote for various types of insurance, and may indicate an associated discount. In other embodiments, the online application may be a virtual loan application, such as for a vehicle, home, business, or personal loans, and may provide terms and conditions of such loans, including an interest rate.

As described herein, verbally inputted data into applications refers to data verbally input by an applicant or applicants into a user computing device for responding to an end-user program (e.g., a good and/or service provider computer app) used to register an applicant for receiving a good or service (also referred to herein as an "item"). For example, an item, such as an insurance policy, provided to an applicant may require the applicant to input data into the end-user program to receive an insurance quote and/or policy.

As described herein, the VA computer system may be configured to facilitate the input of such data from an applicant, using the user computing device, into the end-user program. In addition, the VA computer system may be used for any type of end-user program that is configured to receive data inputted by an applicant to complete an application and/or an online form.

The VA server may also be configured to generate and stream to the user computing device a test calibration phrase for verifying whether the applicant's voice is readable by the VA server. In other words, the test calibration phrase is transmitted in a steady or continuous flow of data to the user computing device. The test calibration phrase may also be used to determine which translation module may be used to translate a particular applicant's voice (or spoken word(s)) into text that is inputted into the application form. The VA server may further be configured to generate and transmit (e.g., stream) to the user computing device a "script" that the applicant is to read aloud (e.g., verbally spoken) and complete using the user computing device for inputting proper data into the application. The VA server may transmit the script in the form of a web page to be displayed on the user computing device.

Although the computer-implemented method for processing verbally inputted data into applications, such as a quote for an insurance policy, is described herein as being performed by a single VA computer system, it should be understood that more than one computing device may perform the various actions and steps described herein as performed by the VA computer system. For example, certain steps of the method may be alternatively performed by the end-user program on the user computing device without departing from the scope of the present disclosure.

In the exemplary embodiment, the host server generates online templates and web pages that include application data. The application data is data that solicits registration information from an applicant. In some embodiments, the host server transmits the online templates and web pages to the VA server. The VA server may then store the online templates and web pages, including the application data, in the VA database. The VA server may also link blank data fields included in the application data to associated taglines (e.g., descriptor phrases) in the application data. As described herein, the VA server may link the descriptor phrases and populated blank data fields to form one or more phrases (e.g., linking a leading portion of a sentence with a portion of the sentence provided by the applicant). The VA server may further fill out the blank data fields with registration data provided by the applicant as described herein.

In the exemplary embodiment, the application data may be configured to solicit and/or request the registration data from the applicant user. For example, the application data may include data requesting input from the applicant corresponding to a type of application, the goods or services associated with the type of application, applicant's information (e.g., an applicant's first name, middle name, last name, date of birth, driver's license, address, and the like), and other data that the VA computer system may require to process an application. The registration data includes data inputted by the applicant user. For example, the registration data may include, among other data, an application identifier (e.g., identifier corresponding to the type of application), item data (e.g., goods or services associated with the type of application), applicant identifying data (e.g., an applicant's first name, middle name, last name, date of birth, driver's license, address, and the like), and other data that the VA computer system may require to process an application, such as an application related to an insurance policy quote, an insurance policy claim, and/or a loan quote.

In the exemplary embodiment, the host server and VA server transmit the application data to the user computing device. In some embodiments, only the host server transmits the application data to the user computing device. In other embodiments, only the VA server transmits the application data to the user computing device. The user computing device may be configured to receive the application data from the host server and/or the VA server. In response to receiving the application data, the user computing device displays the application data to the applicant who may input registration data using, for example, the online templates and the web pages.

In the exemplary embodiment, the applicant may access the host server and/or the VA server via the end-user program executed on the user computing device. The environments hosted on the host server and/or the VA server may include computer-implemented instructions and/or other data executed on the host server and/or the VA server to provide, for example, insurance quotes, insurance policy claims, loan quotes, and/or other information to applicants that have registered or are attempting to register onto the VA computer system.

Accordingly, the end-user program may be configured to facilitate entry of data related to an application, such as an application for an insurance policy quote, an application for submitting insurance policy claim(s), and/or an application for a quote for a loan, using voice recognition technology and dynamic text formatting that may enable the VA computer system to process applications at a faster speed than known application processing systems. More specifically, the VA computer system may be configured to transmit to the user computing device an option for an applicant to verbally speak the input data into the user computing device for processing the application. The option may be included in the application data transmitted from the VA computer system to the user computing device. For example, the user computing device may access the host server, which transmits to the user computing device the application data, including an "Option to Speak" tool. As used herein, the term "application" may mean an electronic document requesting a quote for a product and/or service (e.g., a loan, insurance coverage, etc.), and/or an electronic document requesting a service be performed (e.g., processing an insurance claim for at least a vehicle, home, business, and/or personal insurance coverage).

The applicant may then select on the user computing device the "Option to Speak," and, in response to selecting the "Option to Speak," the user computing device may access the VA server which may transmit instructions to the user computing device to capture voice parameters from the applicant through the use of the test calibration phrase. Voice parameters may include frequency characteristics of the applicant's voice, amplitude characteristics of the applicant's voice, acoustic energy speech patterns exhibited in the applicant's voice, intensity of the applicant's voice, quality of applicant's voice (e.g., degree of vibration, symmetry, rhythm, adduction of vocal folds), and other voice attributes that may be recognized by the VA server and provide a basis to exclude or include voice samples for further consideration as described herein.

If the applicant does not select the "Option to Speak," the user computing device may not access the VA server. Rather, the host server may transmit online templates and/or web pages to the user computing device so the applicant may complete the application using another method, such as typing the information. Conversely, if the applicant selects the "Option to Speak," the user computing device accesses the VA server. The VA server then transmits instructions to the user computing device that enable the user computing device to capture the applicant's voice via an audio device in communication with the user computing device, such as a microphone. In at least some embodiments, the user computing device may include an analog to digital converter and/or other components that convert analog audio waveforms captured by the user computing device into digital sound data for analysis as described herein.

The VA server also transmits instructions instructing the user computing device to display the test calibration phrase for the applicant to read aloud. As described herein, the spoken test calibration phrase is used by the VA computer system to identify, determine, and select the translation module that is required for that applicant to translate the applicant's speech into text. In response to the applicant reading aloud the phrase, the user computing device collects the applicant's voice and converts the voice into digital sound data in real-time. This digital sound data of the applicant's voice (in response to the test calibration phrase) may be referred to as a first set of digital sound data. As defined herein, real-time relates to the VA computer system processing data within a short period of time (e.g., from about milliseconds to minutes, or hours, as opposed to a matter of days) so that the data output and/or input may be available virtually immediately.

In the exemplary embodiment, the user computing device transmits (e.g., streams) the first set of digital sound data to the VA server for analysis. In other embodiments, the user computing device may analyze the first set of digital sound data locally. The analysis is performed to identify one or more voice parameters of the applicant included in the first set of digital sound data.

Once the first set of digital sound data is received by the VA server, the VA server may be configured to parse the first set of digital sound data to identify the one or more voice parameters included in the first set of digital sound data, compare the one or more voice parameters to a sample voice file stored within one of the translation modules, match the one or more voice parameters to the sample voice file, and/or determine and/or verify whether the applicant's voice is readable by the VA server based upon the matching. In the exemplary embodiment, the first set of digital sound data received in response to the applicant reading the test calibration phrase may only include the applicant's voice parameters.

If the VA server determines that the applicant's voice (e.g., first set of digital sound data) is not interpretable by the VA server, the VA server fails the "Option to Speak" and transmits to the user computing device a message indicating that the application data entry may not be spoken by the applicant and other type of data entry must be used (e.g., keyboard input). In that case, the VA server may redirect the user computing device to the host server.

The host server may then transmit online templates and/or web pages to the user computing device so the applicant may input data into the application using another method, such as typing the information. However, if the VA server determines that the applicant's first set of digital sound data is interpretable by the VA server, the VA server approves the "Option to Speak" and launches a speech version of the application.

The speech version may vary depending on the translation module used by the VA server to match the one or more voice parameters to the sample voice file. For example, if the VA server determines that the frequency characteristic of the applicant's voice is 120 Hz, the VA server may launch the speech version that captures frequency characteristics that include 120 Hz.

In another example, the applicant may speak English and pronounce words in a way and/or pattern that the VA server identifies as similar to patterns stored in one of the translation modules (e.g., a specific pronunciation or accent translation module). The VA server may be configured to compare the applicant's words to the patterns in the translation modules to determine which translation module to use. The translation modules may include sample voice files associated with the patterns.

Once the VA server launches the speech version of the application, the VA server may be configured to retrieve sentences, such as leading sentences, from the VA database based upon the type of application the applicant requests. For example, the VA server may receive, from the user computing device, registration data (e.g., a second set of digital sound data) that includes a request from the applicant for a quote on auto insurance for a particular vehicle or multiple vehicles. More specifically, the VA server may be configured to identify from the digital sound data the type of application requested and retrieve from the VA database an application template corresponding to the type of application requested.

The VA server may also be configured to transmit the application template to the user computing device along with instructions for the user computing device to display the application template and capture digital sound data of the applicant including registration data. The VA server may be further configured to parse the VA database to perform a look up for taglines, or descriptor phrases, associated with blank data fields required to be filled out by the applicant.

The blank data fields may be located in partitions of the VA database that correspond to sections of the quote application. For example, a partition of the VA database may correspond to the type of item requiring a quote (e.g., vehicle(s), home(s), or the like). Another partition of the VA database may correspond to the applicant's information (e.g., name, date of birth, driver's license, address, or the like). In some embodiments, the VA server transmits to the host server a request for retrieving the leading sentences from a database in communication with the host server. The host server may retrieve the leading sentences and transmit them to the VA server, which then transmits the leading sentences to the user computing device.

In the exemplary embodiment, the VA server retrieves a first leading sentence that indicates the type of application the applicant requires. For example, the first leading sentence may be "I would like an insurance quote for my _____." The VA server transmits the leading sentence to the user computing device with instructions for the user computing device to display the sentence, as well as the blank portion of the sentence. Once the sentence is displayed, the applicant reads aloud the sentence back to the user computing device including the portion of the sentence that was originally missing.

Continuing with the example above, the user computing device may receive the following sentence read by the applicant: "I would like an insurance quote for my vehicles." In some embodiments, the applicant may not read the sentence, but may type it into the user computing device. The user computing device captures the sentence and transmits it to the VA server. The VA server may parse the sentence and recognize the populated data in the original blank portion. The VA server may store the sentence including the populated portion (e.g., vehicles) within the VA database and, based upon the populated portion, the VA server may determine the next sentence that the VA server should retrieve from the VA database.

In this example, the populated portion is "vehicles"; thus, the next sentence that the VA server may retrieve is, for example, "The number of vehicles is _____ and the number of drivers is _____." The VA server may transmit the sentence to, and receive the sentence with the populated portion from, the user computing device, as described above.

The VA server may also be configured to dynamically add or remove sentences from the application. For example, if the VA server receives a sentence with a populated portion, such as "The number of vehicles is two and the number of drivers is one", the VA server dynamically generates at least one sentence for each vehicle, in this case the number of generated sentences would be two. Each sentence associated with each vehicle may include blank data fields corresponding to information related to each vehicle (e.g., vehicle year, make, model, body style, or the like).

The VA server may be further configured to store within the VA database each populated portion by the applicant and received by the VA server. The VA server may store the populated portions in a partition of the VA database based upon the location (e.g., partitions) where the leading sentence associated with each populated portion was retrieved by the VA server.

Once all the required data fields of the application are populated by the applicant, the VA server determines that the application is complete and stores the complete application within a database, such as the VA database. In the exemplary embodiment, once the VA server determines that the application is complete, the VA server may be configured to calculate, for example, a price quote associated with the complete application based upon the information provided in the application and transmit the calculated price quote to the user computing device, which then displays the calculated price quote to the applicant.

At least one of the technical problems addressed by this system may include: (i) time-consuming, difficult, and/or laborious manual entry of data using a user computing device, such as, but not limited to, a mobile user device such as a smart phone or tablet; (ii) inability to obtain quotes on insurance policies and/or loans, at a time and from a location convenient to the applicant; (iii) mitigating application input errors by leveraging voice recognition technology and developing a simpler and intuitive user interface, (iv) ease of submitting, preparing, or reviewing insurance claims, and/or (v) low quality online customer experience due to impersonal feel of electronic interfaces.

The methods and systems described herein may be implemented using computer programming or engineering techniques including computer software, firmware, hardware, or any combination or subset thereof, wherein the technical effects may be achieved by performing at least one of the following: (a) receiving, from a user computing device, a first set of digital sound data in connection with a request to process an online application for an applicant; (b) enabling a voice-input tool on the user computing device for the applicant to input registration data into the online application, the registration data included in a second set of digital sound data; (c) retrieving a text-based template based upon a portion of the registration data, the text-based template including descriptor phrases and blank data fields, each descriptor phrase linked to a blank data field, each descriptor phrase requesting registration data from the applicant for populating the blank data fields; (d) receiving the registration data as the second set of digital sound data from the applicant via the voice-input tool; (e) translating the second set of digital sound data into text inputs, the text inputs including the descriptor phrases and responses for each blank data field; and/or (f) storing within a database, each descriptor phrase linked to the corresponding response associated therewith.

The technical effect achieved by this system may be at least one of: (i) reduced time and effort required of the user to obtain an insurance quote, or submit an insurance claim; (ii) increased accuracy of underlying data used to generate an insurance quote or a an insurance claim, or loan quotes; (iii) ability to obtain insurance or loan quotes, or submit claims on insurance policies at a time and from a location convenient to the user; and (iv) provision of a personalized user interface to improve the online customer experience.

Exemplary Embodiment of a Voice Analysis (VA) System

FIG. 1 depicts a block diagram of an exemplary embodiment of a voice analysis (VA) computer system 100 for processing digital sound data associated with verbally inputted data into applications, such as insurance quotes, over a communications network. In the exemplary embodiment, VA computer system 100 includes a host server 105 and a voice analysis (VA) server 115. In the exemplary embodiment, VA server 115 is communicatively coupled to host server 105. In other embodiments, VA server 115 and host server 105 are included in a single server.

In the exemplary embodiment, VA computer system 100 is in communication with at least one user computing device 110 associated with a user, such as an applicant having registered or seeking registration onto VA computer system 100. More specifically, VA server 115 and host server 105 are each in communication with the at least one user computing device 110.

VA server 115 may include at least one VA computing device 130. VA server 115 may also include at least one processor in communication with a memory (also referred to herein as voice analysis (VA) database 120). In some embodiments, the memory may include one or more storage devices, including cloud storage devices, internal memory devices, non-centralized databases, and/or combinations thereof.

In the exemplary embodiment, the memory includes VA database 120 and database server 125. Database server 125 may be communicatively coupled to a VA database 120 that stores data. In one embodiment, VA database 120 may include digital sound data and records generated by VA database 120 and/or VA server 115 as described herein.

In the exemplary embodiment, VA database 120 may be stored remotely from VA server 115. In some embodiments, VA database 120 may be decentralized. In the exemplary embodiment, an applicant may access VA database 120 via user computer devices 110 by logging onto VA server 115, as described herein.

In the exemplary embodiment, user computing device 110 includes at least one processor in communication with a memory. User computing device 110 may further include any device capable of accessing the Internet including, but is not limited to, a desktop computer, a mobile computing device, such as a laptop computer, a personal digital assistant (PDA), a cellular phone, a smartphone, smart watch, smart glasses, wearable communication devices (e.g., Bluetooth™ devices), a tablet, or a phablet, or other web-based connectable equipment. In the exemplary embodiment, user computing device 110 may be a mobile computing device, such that ease of data entry into the mobile computing device by the user is reduced due to the absence of a full keyboard and/or pointer device. In some embodiments, user computing device 110 may be in communication with other user computing devices 110.

In the exemplary embodiment, VA server 115 may be configured to process digital sound data associated with verbal input of data into applications, such as verbal input of data into an insurance application for processing policy quotes, over a communications network. More specifically, VA server 115 may include one or more translation modules (not shown) configured to process and/or convert the digital sound data of the applicant into text, and populate blank data fields within VA database 120 using said text. In some embodiments, the one or more translation modules may be included in VA computing device 130.

The digital sound data may include at least applicant's voice parameters (e.g., a first set of digital sound data) and registration data (e.g., a second set of digital sound data) as described in more detail below. As described herein, verbally inputted data into applications refers to data verbally input by an applicant or applicants into a user computing device for responding to an end-user program used to register an applicant for receiving a good or service (also referred to herein as an "item"). For example, an item, such as an insurance policy, provided to an applicant may require the applicant to input data into the end-user program to receive an insurance quote and/or policy.

As described herein, VA computer system 100 may be configured to facilitate the input of such data from an applicant, using user computing device 110, into the end-user program. In addition, VA computer system 100 may be used for any type of end-user program that is configured to receive data inputted by an applicant to complete an application and/or an online form.

VA server 115 may also be configured to generate and transmit to user computing device 110 a test calibration phrase for verifying whether the applicant's voice is readable by VA server 115. The test calibration phrase may also be used to determine which translation module may be used to translate a particular applicant's voice (or spoken word(s)) into text that is inputted into the application form. VA server 115 may be further configured to generate and transmit to user computing device 110 a "script" that includes sentences for the applicant to read aloud and complete using user computing device 110 for inputting the proper data into the application. VA server 115 may transmit the script in the form of a web page to be displayed on user computing device 110.

Although the computer-implemented method for processing verbally inputted data into applications, such as a quote for an insurance policy, is described herein as being performed by a single VA computer system 100, it should be understood that more than one computing device may perform the various actions and steps described herein as performed by VA computer system 100. For example, certain steps of the method may be alternatively performed by the end-user program on user computing device 110 without departing from the scope of the present disclosure.

In the exemplary embodiment, host server 105 generates online templates and web pages that include application data. The application data is data that solicits registration information from an applicant. In some embodiments, host server 105 transmits the online templates and web pages to VA server 115. VA server 115 may then store the online templates and web pages, including the application data, in VA database 120. VA server 115 may also link blank data fields included in the application data to associated taglines (e.g., descriptor phrases) in the application data. VA server 115 may further fill out the blank data fields with registration data provided by the applicant as described herein.

In the exemplary embodiment, the application data may be configured to solicit and/or request the registration data from the applicant. For example, the application data may include data requesting input from the applicant corresponding to a type of application, the goods or services associated with the type of application, applicant's information (e.g., an applicant's first name, middle name, last name, date of birth, driver's license, address, and the like), and other data that VA computer system 100 may require to process an application.

The registration data (e.g., second set of digital sound data) may include the data inputted by the applicant. For example, the registration data may include, among other data, an application identifier (e.g., identifier corresponding to the type of application), item data (e.g., goods or services associated with the type of application), applicant identifying data (e.g., an applicant's first name, middle name, last name, date of birth, driver's license, and the like), and other data that VA computer system 100 may require to process an application, such as an insurance policy quote, as described herein.

In the exemplary embodiment, host server 105 and VA server 115 transmit (e.g., streams) the application data to user computing device 110. In some embodiments, only host server 105 transmits the application data to user computing device 110. In other embodiments, only VA server 115 transmits the application data to user computing device 110. User computing device 110 may be configured to receive the application data from host server 105 and/or VA server 115. In response to receiving the application data, user computing device 110 displays the application data to the applicant, who may then input the registration data using, for example, the online templates and the web pages.

In the exemplary embodiment, the applicant may access host server 105 and/or VA server 115 via the end-user program executed on user computing device 110. The environments hosted on host server 105 and/or VA server 115 may include computer-implemented instructions and/or other data executed on host server 105 and/or VA server 115 to provide, for example, insurance quotes and/or other information to applicants that have registered, or are attempting to register onto VA computer system 100.

Accordingly, the end-user program is configured to facilitate entry of data related to an application, such as a quote for an insurance policy, using voice recognition technology and dynamic text formatting that enables VA computer system 100 to process applications at a substantially faster speed than known application processing systems. More specifically, VA computer system 100 may be configured to transmit to user computing device 110 an option for an applicant to verbally speak the input data into user computing device 110 for processing the application.

The option may be included in the application data transmitted from VA computer system 100 to user computing device 110. For example, user computing device 110 may access host server 105, which transmits to user computing device 110 the application data, including an "Option to Speak" tool. The applicant may then select on user computing device 110 the "Option to Speak," and, in response to selecting the "Option to Speak," user computing device 110 may access VA server 115 which may transmit instructions to user computing device 110 to capture voice parameters (e.g., first set of digital sound data) from the applicant through the use of the test calibration phrase. Voice parameters may include frequency characteristics of the applicant's voice, amplitude characteristics of the applicant's voice, acoustic energy speech patterns exhibited in the applicant's voice, intensity of the applicant's voice, quality of applicant's voice (e.g., degree of vibration, symmetry, rhythm, adduction of vocal folds), and other voice attributes that may be recognized by VA server 115 and provide a basis to exclude or include voice samples for further consideration as described herein.

If the applicant does not select the "Option to Speak," user computing device 110 does not access VA server 115. Rather, host server 105 transmits online templates and/or web pages to user computing device 110 so the applicant may complete the application using another method, such as typing the information. Conversely, if the applicant selects the "Option to Speak," user computing device 110 accesses VA server 115. VA server 115 then transmits instructions to user computing device 110 that enable user computing device 110 to capture the applicant's voice via an audio device in communication with user computing device 110, such as a microphone. In at least some embodiments, user computing device 110 may include an analog to digital converter and/or other components that convert analog audio waveforms captured by user computing device 110 into digital sound data for analysis as described herein.

VA server 115 also transmits instructions instructing user computing device 110 to display the test calibration phrase for the applicant to read aloud. As described herein, the spoken test calibration phrase is used by VA computer system 100 to identify, determine, and select the translation module that is required for that applicant to translate the applicant's speech into text. In response to the applicant reading the phrase aloud, user computing device 110 collects the applicant's voice and converts the voice into a first set of digital sound data in real-time. As defined herein, real-time relates to VA computer system 100 processing data within a short period of time (e.g., from about milliseconds to minutes, or hours, as opposed to a matter of days) so that the data output and/or input may be available virtually immediately.

In the exemplary embodiment, user computing device 110 transmits the first set of digital sound data to VA server 115 for analysis. In other embodiments, user computing device 110 may analyze the first set of digital sound data locally.

The analysis may be performed to identify one or more voice parameters of the applicant included in the digital sound data.

Once the first set of digital sound data (e.g., sound data of the test calibration phrase) is received by VA server 115, VA server 115 may be configured to parse the first set of digital sound data to identify the one or more voice parameters included in the first set of digital sound data, compare the one or more voice parameters to a sample voice file stored within one of the translation modules, match the one or more voice parameters to the sample voice file, and/or determine and/or verify whether the applicant's voice is readable by VA server 115 based upon the matching.

If VA server 115 determines that the applicant's digital sound data is not interpretable by VA server 115, VA server 115 fails the "Option to Speak" and transmits to user computing device 110 a message indicating that the application data entry may not be spoken by the applicant and other type of data entry must be used (e.g., keyboard input). In that case, VA server 115 may redirect user computing device 110 to host server 105.

Host server 105 may then transmit online templates and/or web pages to user computing device 110 so the applicant may input data into the application using another method, such as typing the information. However, if VA server 115 determines that the applicant's digital sound data is interpretable by VA server 115, VA server 115 approves the "Option to Speak" and launches a speech version of the application.

The speech version may vary depending on the translation module used by VA server 115 to match the one or more voice parameters to the sample voice file. For example, if VA server 115 determines that the frequency characteristic of the applicant's voice is 120 Hz, VA server 115 launches the speech version that captures frequency characteristics that include 120 Hz.

In another example, the applicant may speak English and pronounce words in a way and/or pattern that VA server 115 identifies as similar to patterns stored in one of the translation modules (e.g., a specific pronunciation or accent translation module). VA server 115 may be configured to compare the applicant's words to the patterns in the translation modules to determine which translation module to use. The translation modules may include sample voice files associated with the patterns.

Once VA server 115 launches the speech version of the application, VA server 115 is configured to retrieve sentences, such as leading sentences, from VA database 120 based upon the type of application the applicant requests. For example, VA server 115 may receive registration data (e.g., a second set of digital sound data) from user computing device 110 such as a request from the applicant for a quote on auto insurance for a particular vehicle or multiple vehicles. More specifically, VA server 115 is configured to parse VA database 120 to perform a look up for taglines associated with blank data fields required to be filled out by the applicant.

The blank data fields may be located in partitions of VA database 120 that correspond to sections of the quote application. For example, a partition of VA database 120 may correspond to the type of item requiring a quote (e.g., vehicle(s), home(s), or the like). Another partition of VA database 120 may correspond to the applicant's information (e.g., name, date of birth, driver's license, address, or the like). In some embodiments, VA server 115 transmits to host server 105 a request for retrieving the leading sentences from a database in communication with host server 105. Host server 105 retrieves the leading sentences and transmits them to VA server 115 which then transmits the leading sentences to user computing device 110.

In the exemplary embodiment, VA server 115 retrieves a first leading sentence that indicates the type of application the applicant requires. For example, the first leading sentence may be "I would like an insurance quote for my _____." VA server 115 transmits the leading sentence to user computing device 110 with instructions for user computing device 110 to display the sentence as well as the blank portion of the sentence.

Once the sentence is displayed, the applicant reads aloud the sentence back to user computing device 110 including the portion of the sentence that was originally missing. Continuing with the example above, user computing device 110 may receive the following sentence read by the applicant: "I would like an insurance quote for my vehicles." User computing device 110 captures the sentence and transmits it to VA server 115. VA server 115 parses the sentence and recognizes the populated data in the original blank portion. VA server 115 stores the sentence including the populated portion (e.g., vehicles) within VA database 120 and, based upon the populated portion, VA server 115 determines the next sentence that VA server 115 should retrieve from VA database 120.

In this example, the populated portion is "vehicles"; thus, the next sentence that VA server 115 may retrieve is, for example, "The number of vehicles is _____ and the number of drivers is _____." VA server 115 transmits the sentence to and receives the sentence with the populated portion from user computing device 110, as described above.

VA server 115 may be configured to dynamically add or remove sentences from the application. For example, if VA server 115 receives a sentence with a populated portion, such as "The number of vehicles is two and the number of drivers is one", VA server 115 dynamically generates at least one sentence for each vehicle, in this case the number of generated sentences would be two. Each sentence associated with each vehicle may include blank data fields corresponding to information related to each vehicle (e.g., vehicle year, make, model, body style, or the like).

VA server 115 is further configured to store within VA database 120 each populated portion by the applicant and received by VA server 115. VA server 115 stores the populated portions in a partition of VA database 120 based upon the location (e.g., partitions) where the leading sentence associated with each populated portion was retrieved by VA server 115.

Once all the required data fields of the application are populated with registration data by the applicant, VA server 115 determines that the application is complete and stores the complete application within a database, such as VA database 120. In the exemplary embodiment, once VA server 115 determines that the application is complete, VA server 115 is configured to calculate, for example, a price quote associated with the complete application based upon the information provided in the application and transmit the calculated price quote to user computing device 110, which then displays the calculated price quote to the applicant.

Exemplary Configuration of a Voice Analysis (VA) Database

Figure 2:
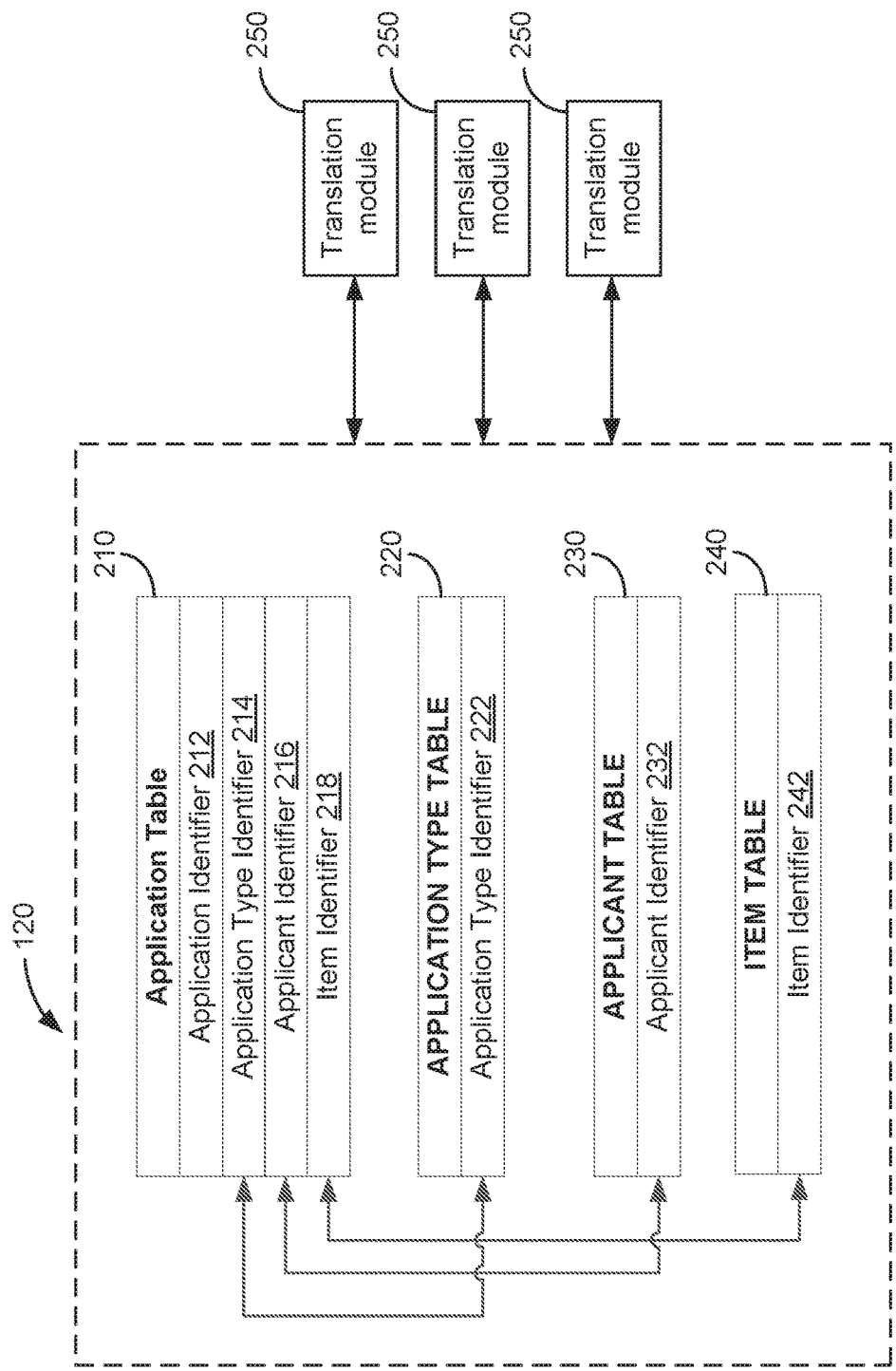
FIG. 2 illustrates a schematic diagram of an exemplary configuration of a voice analysis (VA) database used by the VA computer system shown in FIG. 1.

FIG. 2 illustrates a schematic diagram of an exemplary configuration of a voice analysis (VA) database 120 used by VA computer system 100 (shown in FIG. 1) for processing digital sound data associated with an application over a communications network. VA database 120 is in communication with one or more translation modules 250 and includes a plurality of partitions. The partitions may also be referred to herein as tables or database tables. In some embodiments, VA database 120 includes at least, application table 210, application type table 220, applicant table 230, and item table 240.

Application records in application table 210 are uniquely identified by application identifier 212. Application type records in application type table 220 are uniquely identified by application type identifier 222. Applicant records in applicant table 230 are uniquely identified by applicant identifier 232. Item records in item table 240 are uniquely identified by item identifier 242.

In some embodiments, identifiers are generated by VA database 120. Additionally or alternatively, identifiers may be generated by VA server 115 (shown in FIG. 1) based upon digital sound data (e.g., applicant voice data provided in response to a test calibration phrase and registration data provided in response to an online application) transmitted by user computing device 110 (shown in FIG. 1) associated with an applicant of the application. In some embodiments, application type table 220, applicant table 230, and item table 240 may include multiple application types, applicants, and/or items, respectively.

In the example embodiment, application records in application table 210 include application identifier 212, application type identifier 214, applicant identifier 216, and item identifier 218. In this embodiment, application records are associated with application type records, applicant records, and item records. More specifically, application type identifier 214, applicant identifier 216, and item identifier 218 are associated with application type identifier 222, applicant identifier 232, and item identifier 242, respectively. In other embodiments, application records include other records that are associated with an application, such as company records when the applicant has a plan with an insurance company, for example.

VA server 115 is configured to generate a test calibration phrase and transmit the test calibration phrase to user computing device 110 when the applicant selects an "Option to Speak" as described above. In response to receiving the test calibration phrase, user computing device 110 displays the phrase to the applicant who reads aloud the phrase to the user computing device 110. User computing device 110 then captures the applicant's voice and converts it into a first set of digital sound data. The first set of digital sound data includes at least applicant's one or more voice parameters. Once the first set of digital sound data is received by VA server 115, VA server 115 is configured to parse the first set of digital sound data to identify the one or more voice parameters included in the first set of digital sound data, compare the one or more voice parameters to a sample voice file stored within one of the translation modules 250, match the one or more voice parameters to the sample voice file, and/or determine and/or verify whether the applicant's voice is readable by VA server 115 based upon the matching.

If VA server 115 determines that the applicant's digital sound data is readable, VA server 115 approves the "Option to Speak" and launches a speech version of the application. The speech version may vary depending on the translation module 250 used by VA server 115 to match the one or more voice parameters to the sample voice file.

Once VA server 115 launches the speech version of the application, VA server 115 is configured to retrieve sentences, such as leading sentences, from VA database 120 based upon the type of application the applicant requests. Thus, VA server may perform a look up within application type table 220 to identify and retrieve sentences associated with the type of application (e.g., vehicle insurance quote, home insurance quote, or the like) the applicant requested. For example, VA server 115 may receive from user computing device 110 a request from the applicant for a vehicle quote. More specifically, VA server 115 is configured to parse VA database 120 to perform a look up for taglines associated with blank data fields required to be filled out by the applicant.

The blank data fields may be located in different tables or partitions of VA database 120 that correspond to sections of the application. For example, VA server 115 may perform a look up within item table 240 to identify and retrieve sentences associated with the type of item requiring a quote (e.g., vehicle, home, or the like). VA server 115 may also perform a look up within applicant table 230 to identify and retrieve sentences associated with the applicant's information (e.g., name, date of birth, driver's license, or the like).

In some embodiments, VA server 115 transmits to host server 105 a request for retrieving the sentences from a database in communication with host server 105. Host server 105 retrieves the leading sentences and transmits them to VA server 115 which then transmits the sentences to user computing device 110.

VA server 115 is also configured to generate and/or update records in application table 210, application type table 220, applicant table 230, and item table 240 using the digital sound data. As described above, VA server 115 is configured to parse digital sound data (e.g., applicant voice data in response to the test calibration phrase and registration data in response to the online application), store the parsed digital sound data in the corresponding table, and generate records using the stored digital sound data. For example, an applicant may submit via user computing device 110 a second set of digital sound data (e.g., registration data) including application type information (e.g., type of quote), applicant information (e.g., applicant's name, address, date of birth, or the like), item information (e.g., vehicle's make, year, model, type of home, number of rooms in home, home address, or the like) to VA server 115. VA server 115 receives the second set of digital sound data, parses the second set of digital sound data, and stores the parsed second set of digital sound data in the corresponding table.

In this example, VA server 115 generates application identifier 212, application type identifier 222, applicant identifier 232, and item identifier 242. Then, VA server 115 stores application identifier 212 in application table 210, the application type information and application type identifier 222 in application type table 220, the applicant information and applicant identifier 232 in applicant table 230, and the item information and item identifier 242 in item table 240.

As stated above, VA server 115 generates records in application table 210, application type table 220, applicant table 230, and item table 240 using the digital sound data. The application records generated by VA server 115 may include application identifier 212, application type identifier 214, applicant identifier 216, and item identifier 218 as described above. By generating the application records, VA server 115 is able to determine the records associated with every application (e.g., each application identifier stored in application table 210). VA server 115 is configured to display the application records to an applicant and/or an application provider, such as an insurance provider. VA server 115 is also configured to display the application records based upon predefined user settings. For example, VA server 115 may grant specific access to an applicant based upon the application type identifier 222. That is, VA server 115 may only grant access to the applicant to the application(s) associated with the applicant.

Exemplary Method for Launching a Voice-Based End-User Program

Figure 3:
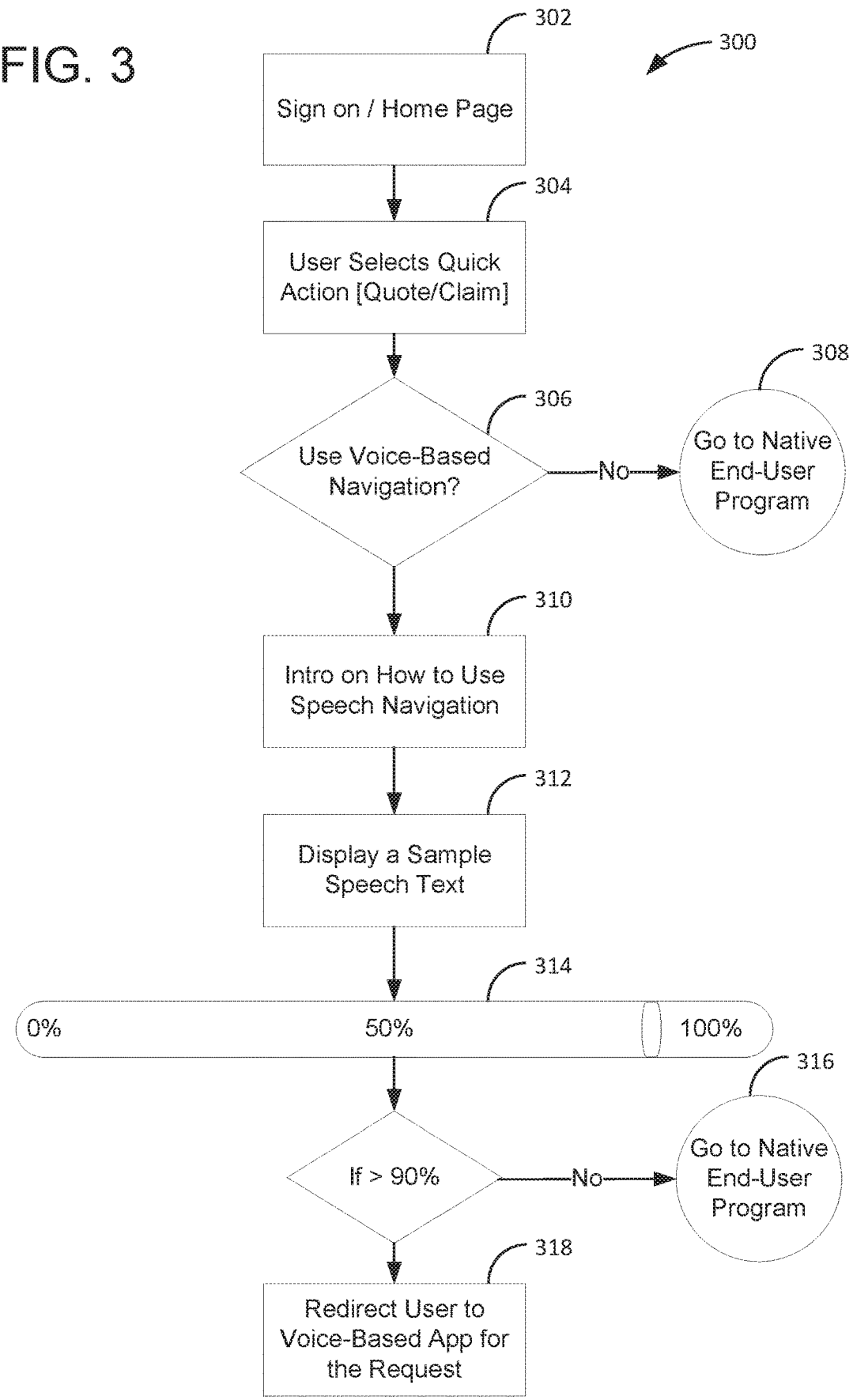
FIG. 3 illustrates a schematic diagram of an exemplary voice based application launched by the VA computer system shown in FIG. 1.

FIG. 3 is schematic diagram of an exemplary voice based application method 300 launched by VA computer system 100 (shown in FIG. 1). In the exemplary embodiment, an applicant requesting an application signs on an end-user program or navigates to an insurer home page 302 to initiate the quote process. The applicant uses a user computing device, such as user computing device 110 (shown in FIG. 1), to initiate the application process. Host server 105 (shown in FIG. 1) is configured to display on user computing device 110 a quote initiation selection 304 (e.g., "Quick Action [Quote/Claim]") once the applicant has accessed host server 105. When the applicant has selected to initiate the quote, host server 105 is configured to display on user computing device 110 a voice-based navigation option 306.

If the applicant does not select the voice-based navigation option 306, host server 105 redirects user computing device 110 to a native end-user program 308, which is a program in which the applicant enters application information (e.g., quote information) using different methods from voice recognition (e.g., typing the quote information). If the applicant selects the voice-based navigation option 306, host server 105 directs user computing device 110 to VA server 115 (shown in FIG. 1). VA server 115 is configured to transmit a video and/or text introduction 310 to user computing device 110 that explains and/or introduces how to use the voice-based navigation (e.g., speech navigation). In some embodiments, the host server transmits the introduction 310 to user computing device 110.

VA server 115 may also be configured to transmit to and display on user computing device 110 sample speech text 312. The applicant reads sample speech text 312 aloud to user computing device 110. User computing device 110 may be configured to collect the voice of the applicant, convert the voice into a first set of digital sound data, and transmit the first set of digital sound data to VA server 115. VA server 115 may be further configured to parse the first set of digital sound data to identify one or more voice parameters of the applicant included in the first set of digital sound data, compare the one or more voice parameters to a sample voice file stored within VA database 120 (shown in FIGS. 1 and 2), match the one or more voice parameters to the sample voice file, and determine and/or verify whether the applicant's voice is readable by VA server 115 based upon the matching.

VA server 115 may be configured to transmit the results of the matching to user computing device 110. In the exemplary embodiment, VA server 115 transmits the results to user computing device 110 along with instructions for user computing device 110 to display the results in the form of a slider bar 314 illustrating the matching on a scale from 0 percent to 100 percent. In some embodiments, if the results are less than or equal to a predefined threshold, such as 90 percent, VA server 115 redirects user computing device 110 to the native end-user program 316. If the results are greater than the predefined threshold (e.g., 90 percent), VA server 115 redirects user computing device 110 to a voice-based end-user program 318, which is a program where the applicant enters application information (e.g., quote information) using voice recognition methods.

Exemplary User Computing Device

Figure 4:
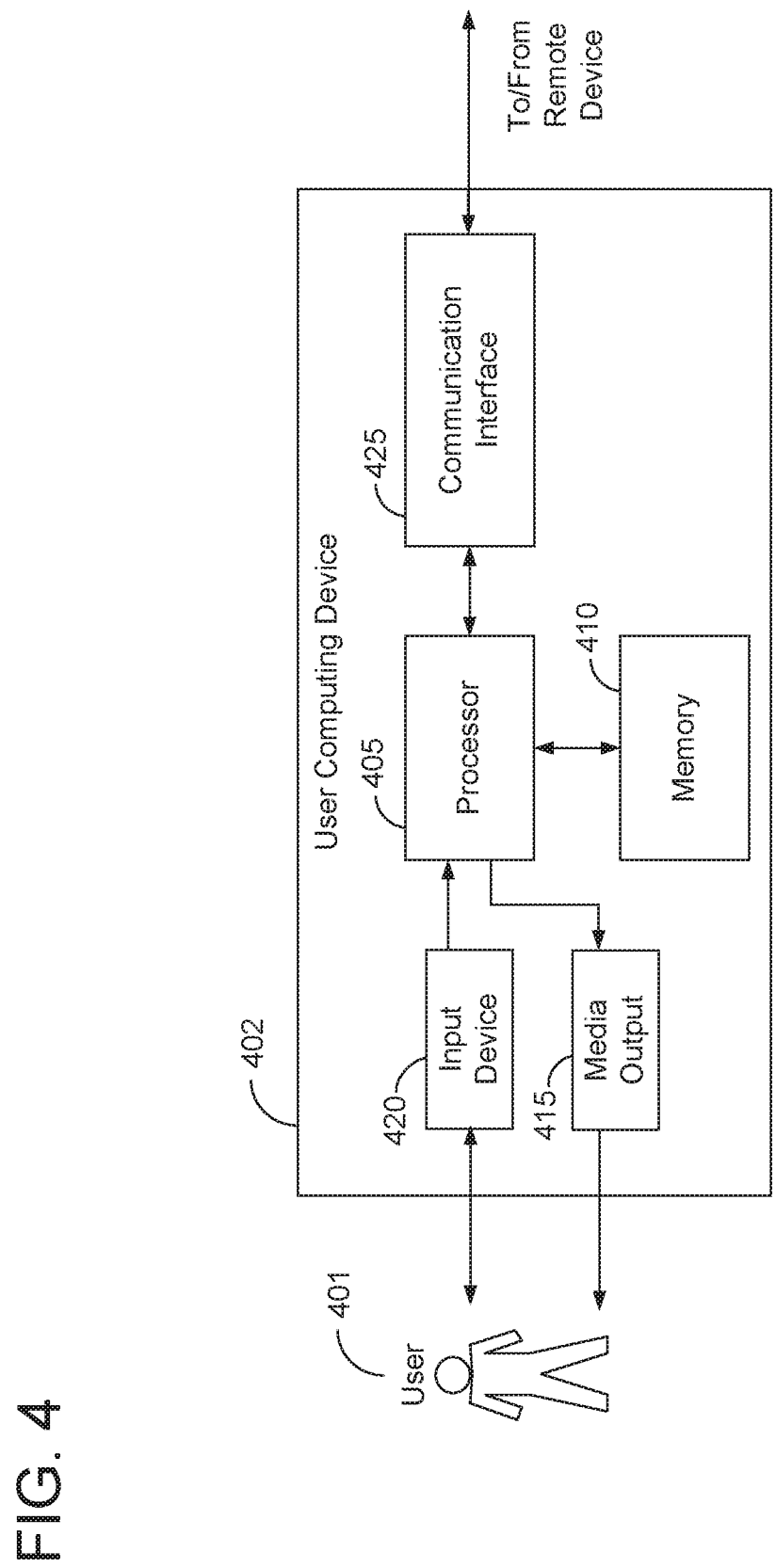
FIG. 4 illustrates an exemplary configuration of a user computing device shown in FIG. 1, in accordance with one embodiment of the present disclosure.

FIG. 4 depicts an exemplary configuration of a user computing device 402. User computing device 402 may be operated by a user 401. User computing device 402 may include, but is not limited to, user computing devices 110 (shown in FIG. 1). User computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computing device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or an end-user program) to user 401. A graphical user interface may include, for example, an online insurance interface for viewing and/or applying items for applications, such as insurance policy quotes. In some embodiments, user computing device 402 may include an input device 420 for receiving input from user 401. User 401 may use input device 420 to, without limitation, select and/or enter one or more items to purchase and/or a purchase request, or to access credential information, and/or payment information.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component, such as a touch screen, may function as both an output device of media output component 415 and input device 20.

User computing device 402 may also include a communication interface 425, communicatively coupled to a remote device such as host server 105 and VA server 115 (both shown in FIG. 1). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser, and/or an end-user program. Web browsers enable users, such as user 401, to display and interact with media and other information typically embedded on a web page or a website from host server 105 and/or VA server 115.

An end-user program allows user 401 to interact with, for example, host server 105 and/or VA server 115. For example, instructions may be stored by a cloud service, and the output of the execution of the instructions sent to the media output component 415.

Processor 405 executes computer-executable instructions for implementing aspects of the disclosure. In some embodiments, the processor 405 is transformed into a special purpose microprocessor by executing computer-executable instructions or by otherwise being programmed.

Exemplary Server Computing Device

Figure 5:
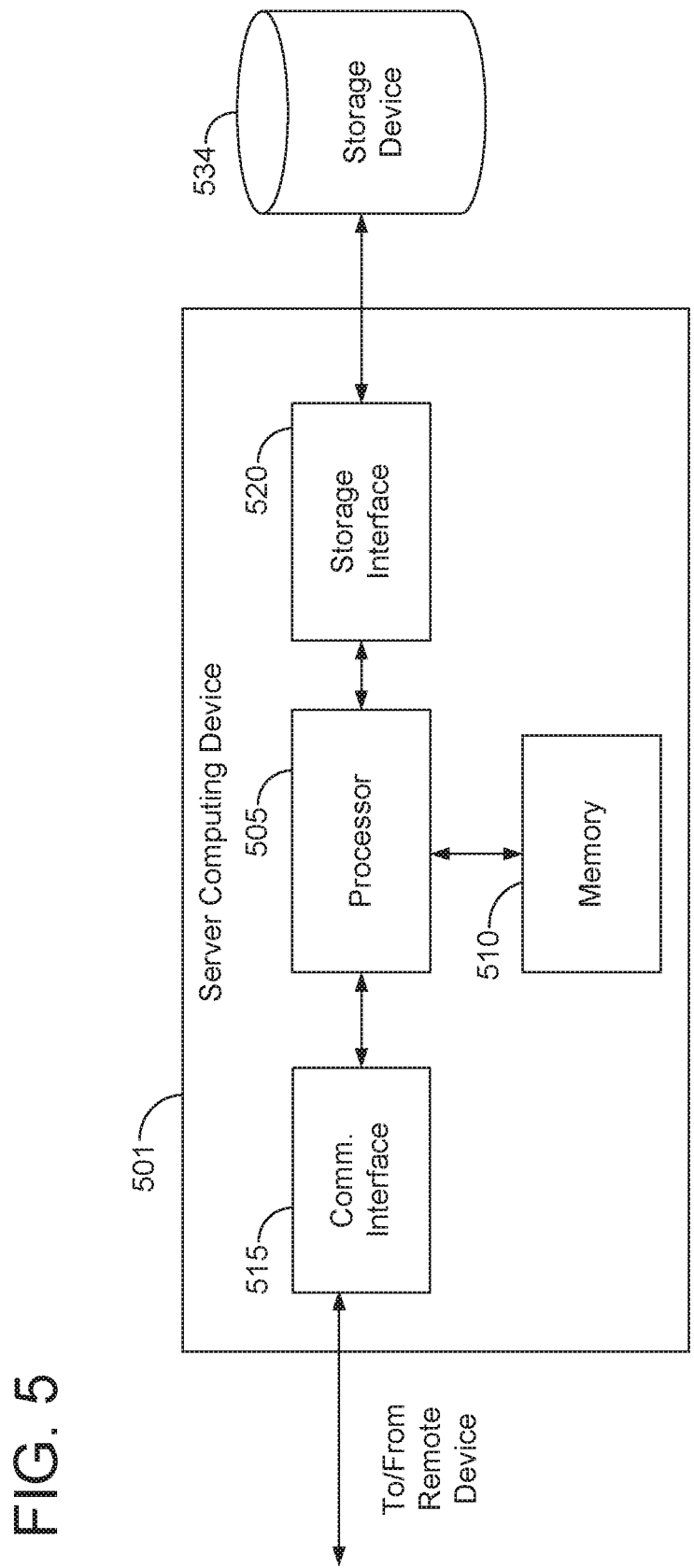
FIG. 5 illustrates a simplified block diagram of an exemplary server system, in accordance with one embodiment of the present disclosure.

FIG. 5 depicts an exemplary configuration of a server computing device 501, in accordance with one exemplary embodiment of the present disclosure. Server computing device 501 may include, but is not limited to, host server 105, VA server 115, and database server 125 (all shown in FIG. 1). Server computing device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computing device 501 is capable of communicating with a remote device, such as another server computing device 501 and user computing devices 110 (shown in FIG. 1). For example, communication interface 515 may receive requests from, and transmits data to, user computing devices 110 via the Internet, as illustrated in FIG. 1.

Processor 505 may also be operatively coupled to a storage device 534. Storage device 534 may be any computer-operated hardware suitable for storing and/or retrieving data, such as, but not limited to, data associated with VA database 120 (shown in FIG. 1).

In some embodiments, storage device 534 may be integrated in server computing device 501. For example, server computing device 501 may include one or more hard disk drives as storage device 534.

In other embodiments, storage device 534 may be external to server computing device 501 and may be accessed by a plurality of server computing devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with instructions, such as illustrated in FIG. 3.

Figure 6:
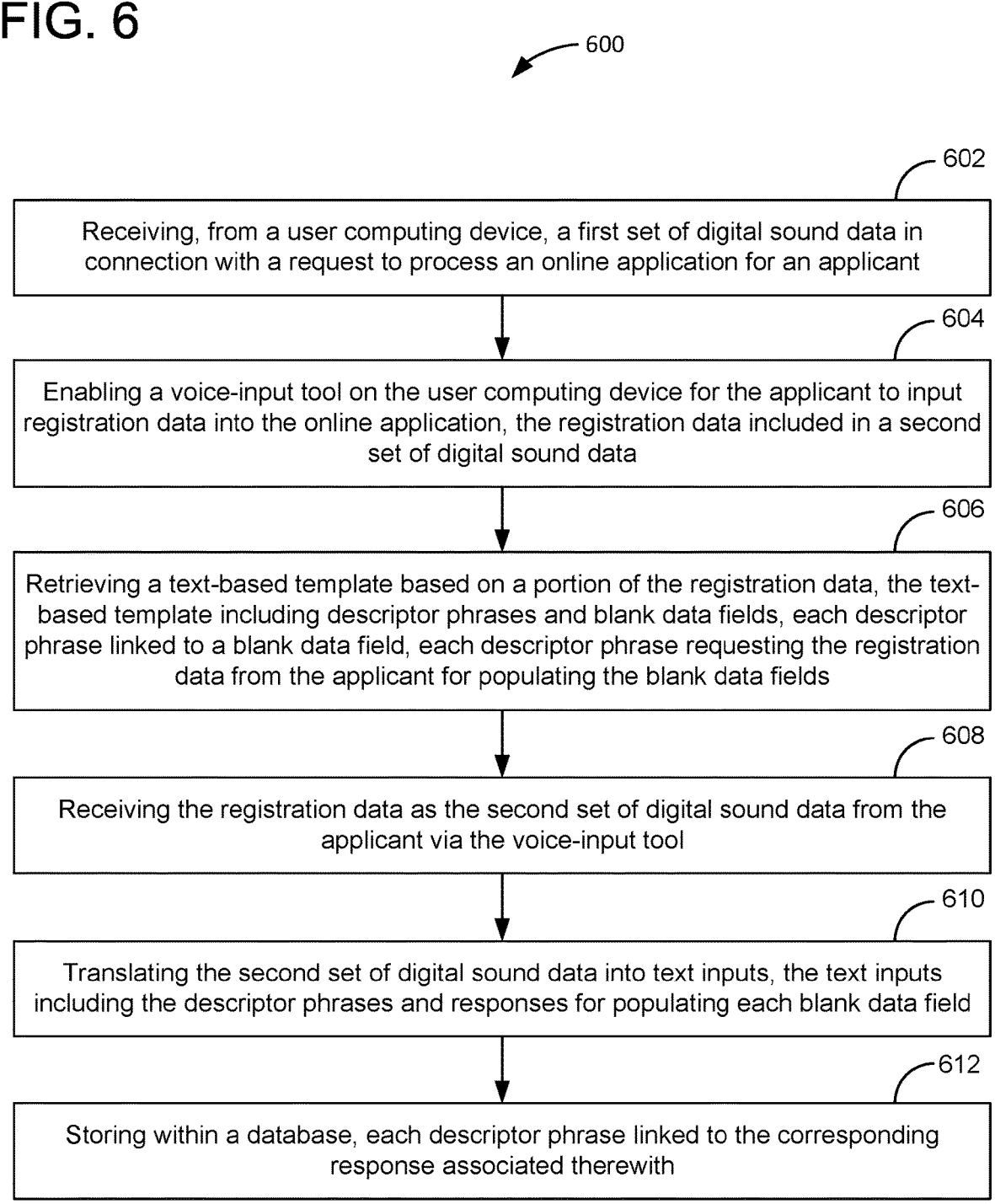
FIG. 6 is a flow diagram illustrating an exemplary process for processing digital sound data over a communications network.

Exemplary Computer-Implemented Method for Processing Verbally Inputted Data into Applications Using Digital Sound Data FIG. 6 illustrates a flow chart of an exemplary computer-implemented method 600 for processing verbally inputted data into applications using digital sound data. Method 600 may be implemented by a computing device, for example VA computer system 100 (shown in FIG. 1). In the exemplary embodiment, VA computer system 100 includes VA server 115 which may be in communication with host server 105, VA computing device 130, user computing devices 110, VA database 120, and database server 125 (all shown in FIG. 1). In the exemplary embodiment, the online application that may be generated using VA computing system 100 includes at least an insurance quote application, a loan application, and an insurance claim processing application (e.g., an insurance claim submission application). It should be noted that these three types of applications are described herein for exemplary purposes. However, this application is not limited to these examples. Rather, VA computing system 100 could be used to generate any type of online application or document for requesting a service or product.

In the exemplary embodiment, the computer-implemented method may include receiving 602, from a user computing device, a first set of digital sound data in connection with a request to process an online application for an applicant, and enabling 604 a voice-input tool on the user computing device for the applicant to input registration data into the online application, the registration data included in a second set of digital sound data. The method may also include retrieving 606 a text-based template based upon a portion of the registration data, the text-based template including descriptor phrases and blank data fields, with each descriptor phrase linked to a blank data field, and each descriptor phrase requesting registration data from the applicant for populating the blank data fields.

The method may further include receiving 608 the registration data as the second set of digital sound data from the applicant via the voice-input tool. The method may also include translating 610 the second set of digital sound data into text inputs, the text inputs including the descriptor phrases and responses for each blank field. The method may further include storing 612 within a database, each descriptor phrase linked to the corresponding response associated therewith.

Exemplary Computing Device

Figure 7:
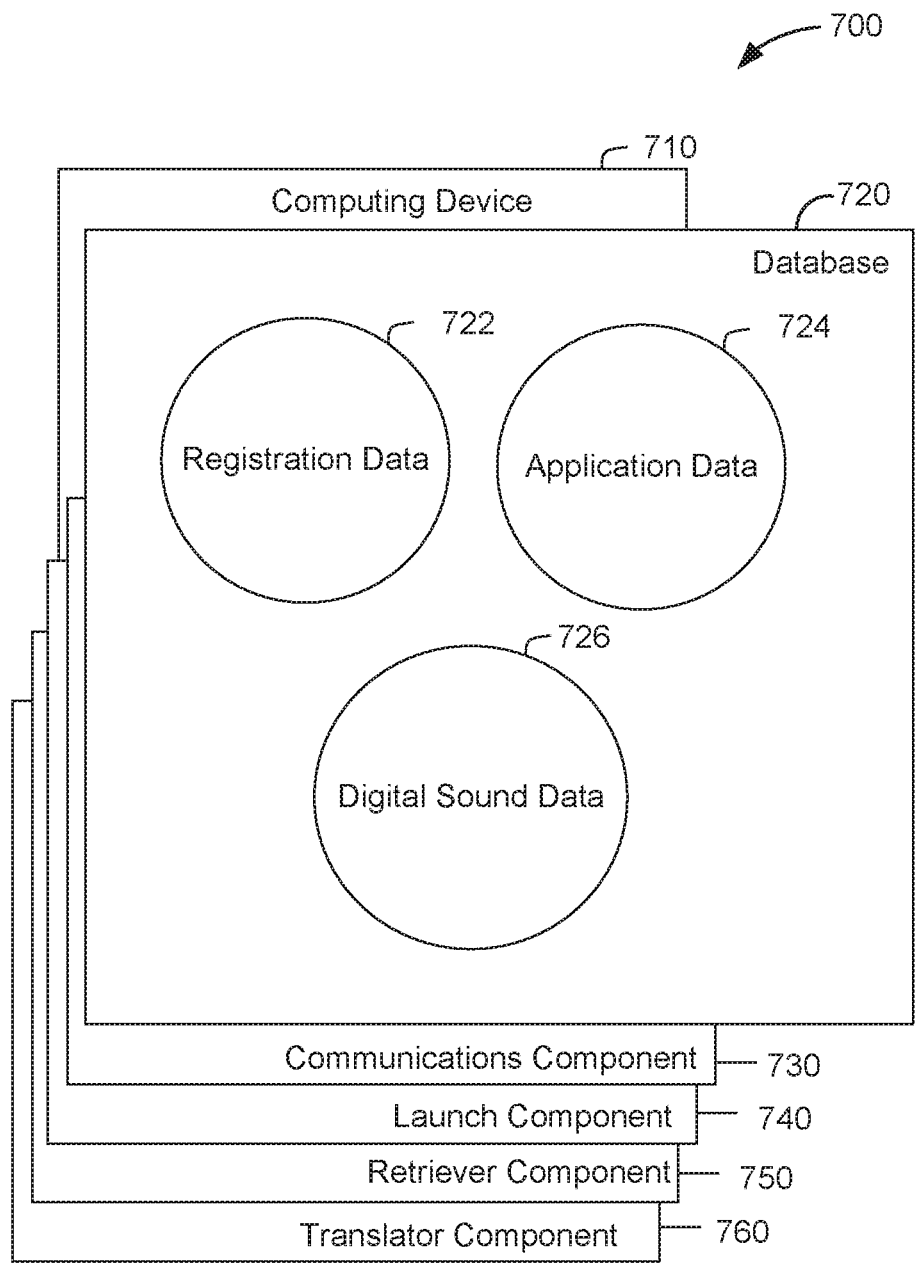
FIG. 7 shows a diagram of components of one or more exemplary computing devices that may be used to implement a quote application in certain embodiments of the method shown in FIG. 6.

FIG. 7 depicts a diagram 700 of components of one or more exemplary computing devices 710 that may be used in VA computer system 100 shown in FIG. 1. In some embodiments, computing device 710 may be similar to host server 105 and VA server 115 (both shown in FIG. 1). FIG. 7 further shows a configuration of data in database 720, which may be similar to voice analysis (VA) database 120 (shown in FIGS. 1 and 2), memory 510 and/or storage device 534 (both shown in FIG. 5). Database 720 may include, for example, registration data 722, application data 724, and digital sound data 726. Database 720 may be coupled with several separate components within computing device 710, which perform specific tasks.

More specifically, computing device 710 may include a communications component 730 configured to receive, from user computing device 110 (shown in FIG. 1), a first set of digital sound data 726 in connection with a request to process an online application for an applicant. Communications component 730 may be configured to receive registration data 722 as a second set of digital sound data 726 from the applicant via a voice-input tool.

Computing device 710 may also include a launch component 740 configured to enable a voice-input tool on a user computing device for the applicant to input registration data 722 into the online application, the registration data included in a second set of digital sound data. Computing device 710 may further include a retriever component 750 configured to retrieve a text-based template based upon a portion of registration data 722, the text-based template including descriptor phrases and blank data fields, with each descriptor phrase linked to a blank data field, and each descriptor phrase requesting registration data 722 from the applicant for populating the blank data fields. Computing device 710 may additionally include a translator component 760 configured to translate the second set of digital sound data into text inputs, the text inputs including the descriptor phrases and responses for each blank data field.

Exemplary Insurance Quote Application Template

FIGS. 8 and 9 depict exemplary configurations of application templates 800 and 900, such as application templates for requesting an insurance quote. In the exemplary embodiment, application template 800 may be stored in VA database 120 (shown in FIG. 1). Application template 800 may be associated with application type identifiers 214 and 222 (shown in FIG. 2). In the exemplary embodiment, after VA server 115 (shown in FIG. 1) has launched a speech version of an application, VA server 115 receives from user computing device 110 (show in FIG. 1) a request from an applicant to fill out a particular application, such as a quote on auto insurance for a particular vehicle or multiple vehicles.

More specifically, VA server 115 transmits (e.g., streams) to user computing device 110 application data including a first descriptor phrase, such as descriptor phrase 801 and a blank data field, such as blank data field 802. The descriptor phrase may also be referred to as a template phrase. Each descriptor phrase includes pre-populated data fields included in application template 800.

Descriptor phrase 801 is associated with blank data field 802. A descriptor phrase identifier and a blank data field identifier may link descriptor phrase 801 to blank data field 802. Descriptor phrase 801 and blank data field 802 may include phrases, such as leading sentences.

In one example, the leading sentence may include the following text: "I would like an insurance quote for my _____." In response to receiving the application data, user computing device 110 displays the text to the applicant and receives the digital data including the registration data (e.g., second set of digital sound data) from the applicant. For example, user computing device 110 may capture a sentence, such as "I would like an insurance quote for my vehicles." User computing device 110 may transmit the sentence to VA server 115.

VA server 115 may then translate the sentence to text, parse the text, and recognize the populated data in the original blank data field (e.g., vehicles). VA server 115 is configured to use the populated data to retrieve from VA database 120 an application template corresponding to the populated data. In this case, VA server 115 retrieves application template 800 which corresponds to an auto insurance quote. VA server 115 may also store the descriptor phrase and populated data into VA database 120.

Once VA server 115 retrieves application template 800, VA server 115 transmits the application data associated with application template 800 to user computing device 110. User computing device 110 displays the application data to the applicant. Continuing with the example above, the applicant reads aloud a sentence included in descriptor phrase 803 and blank data field 804, and descriptor phrase 805 and blank data field 806. In this example, the applicant reads aloud: "The number of vehicles is four and the number of drivers is two."

User computing device 110 captures the sentence and transmits the sentence in the form of registration data to VA server 115. VA server 115 translates the sentence to text, parses the text, and recognizes the populated data in the original blank data fields (e.g., four and two). Based upon the descriptor phrase, VA server 115 stores the populated data within VA database 120. For example, VA server 115 associates second descriptor phrase 803 with data in original blank data field 804 and stores descriptor phrase 803 along with the data in original blank data field 804.

In the exemplary embodiment, VA server 115 is configured to transmit the populated sentence (e.g., the sentence including the translated text) to user computing device 110, which displays it to the applicant. The applicant then may verify that the inputted data is correct by transmitting to the VA server 115, using the user computing device, a confirmation that the inputted data is correct. In other embodiments, user computing device 110 may populate the sentence prior to transmitting the registration data to VA server 115.

In the exemplary embodiment, VA server 115 may be configured to dynamically retrieve and/or skip descriptor phrases. In the current example, the applicant is applying for an auto insurance for four vehicles and two drivers. VA server 115 is configured to retrieve from VA database 120 descriptor phrases corresponding to multiple vehicles and drivers. For example, descriptor phrase 807 is associated with blank data field 808 and requests information for a first driver, whereas descriptor phrase 809 is associated with blank data field 810 and requests information for a second driver. Similarly, descriptor phrase 811 is associated with blank data field 812 and requests information for a first vehicle, whereas descriptor phrase 813 is associated with blank data field 814 and requests information for a second vehicle.

VA server may skip a descriptor phrase when some information does not apply to the applicant. For example, if the applicant does not have a vehicle insurance, VA server 115 may skip the descriptor phrases 815 and 816 which request the expiration date of the current insurance.

Once application template 800 is complete as illustrated, for example, in completed application template 900 in FIG. 9, VA server 115 is configured to use the data inputted in completed application template 900 and generate a report, such as an auto insurance quote. VA server 115 then transmits the report to user computing device 110 for display.

Exemplary Online Loan Quote Application Template

FIGS. 10 and 11 depict exemplary configurations of application templates 1000 and 1100, such as application templates for requesting an online loan quote. In the exemplary embodiment, application template 1000 may be stored in VA database 120 (shown in FIG. 1). Application template 1000 may be associated with application type identifiers 214 and 222. In the exemplary embodiment, after VA server 115 (shown in FIG. 1) has launched a speech version of an application, VA server 115 receives from user computing device 110 (show in n FIG. 1) a request from an applicant to fill out a particular application, such as an online loan quote for a home.

More specifically, VA server 115 transmits (e.g., streams) to user computing device 110 application data including a descriptor phrase, such as descriptor phrase 1001 and a blank data field, such as blank data field 1002. The descriptor phrase may also be referred to as a template phrase. Each descriptor phrase includes pre-populated data fields included in application template 1000.

Descriptor phrase 1001 is associated with blank data field 1002. A descriptor phrase identifier and a blank data field identifier may link descriptor phrase 1001 to blank data field 1002. Descriptor phrase 1001 and blank data field 1002 may include phrases, such as leading sentences.

In one example, the leading sentence may include the following text: "I would like a loan quote for a _____." In response to receiving the application data, user computing device 110 displays the text to the applicant and receives the digital data including the registration data (e.g., second set of digital sound data) from the applicant. For example, user computing device 110 may capture a sentence, such as "I would like a loan quote for a home." User computing device 110 may transmit the sentence to VA server 115.

VA server 115 may then translate the sentence to text, parse the text, and recognize the populated data in the original blank data field (e.g., home). VA server 115 is configured to use the populated data to retrieve from VA database 120 an application template corresponding to the populated data. In this case, VA server 115 retrieves application template 1000 which corresponds to a quote for an online loan for a residential real estate property, such as a home (e.g., a mortgage). VA server 115 may also store the descriptor phrase and populated data into VA database 120.

Once VA server 115 retrieves application template 1000, VA server 115 transmits the application data associated with application template 1000 to user computing device 110. User computing device 110 displays the application data to the applicant. Continuing with the example above, the applicant reads aloud a sentence included in descriptor phrase 1003 and blank data field 1004, and descriptor phrase 1005 and blank data field 1006. In this example, the applicant reads aloud: "The price of the home is threehundredthousanddollars and the down payment is fortyfivethousanddollars."

User computing device 110 captures the sentence and transmits the sentence in the form of registration data to VA server 115. VA server 115 translates the sentence to text, parses the text, and recognizes the populated data in the original blank data fields (e.g., three hundred thousand dollars and forty five thousand dollars). Based upon the descriptor phrase, VA server 115 stores the populated data within VA database 120. For example, VA server 115 associates descriptor phrase 1003 with data in original blank data field 1004 and stores second descriptor phrase 1003 along with the data in original blank data field 1004.

In the exemplary embodiment, VA server 115 is configured to transmit the populated sentence (e.g., the sentence including the translated text) to user computing device 110, which displays it to the applicant. The applicant then may verify that the inputted data is correct by transmitting to the VA server 115, using the user computing device, a confirmation that the inputted data is correct. In other embodiments, user computing device 110 may populate the sentence prior to transmitting the registration data to VA server 115.

In the exemplary embodiment, VA server 115 may be configured to dynamically retrieve and/or skip descriptor phrases. In the current example, the applicant is applying for a home loan for three hundred thousand dollars and giving a down payment of forty five thousand dollars, which is equivalent to fifteen percent of the total price of the home. In the exemplary embodiment, VA server 115 is configured to determine whether the home loan requires a private mortgage insurance (PMI). In general, PMIs are required when the down payment amount is less than twenty percent of the price of the home. In this example, the down payment amount is less than twenty percent. Thus, VA server 115 determines a PMI is required for the home loan and retrieves from VA database 120 descriptor phrases corresponding to a home loan including information related to a PMI. For example, descriptor phrase 1007 is associated with blank data field 1008 and requests information for the type of PMI (e.g., Borrower-Paid PMI (BPMI), Single Premium (PMI), or Lender-Paid PMI (LPMI)) that the applicant would like to obtain. The PMI selection may be read aloud by the applicant or may be selected from a drop-down by the applicant. Depending on the type of PMI the applicant selects, VA server 115 retrieves from VA database 120 descriptor phrases corresponding to the type of PMI the applicant selected.

VA server 115 may skip a descriptor phrase when some information does not apply to the applicant. For example, if the applicant indicates that there is no additional applicant applying for the same home loan (e.g., spouse, co-signor, or the like), VA server 115 may skip the descriptor phrase 1009 which requests information related to the additional applicant (e.g., additional applicant's name).

In the exemplary embodiment, VA server 115 may be in communication with at least one bureau computing device associated with a credit report bureau that provides credit scores of applicants. For example, VA server 115 may be configured to request to and receive from the at least one bureau computing device credit scores of applicants. VA server 115 may be also in communication with at least one real estate listing computing device and/or at least one real estate listing database providing at least one listing of real estate properties (e.g., residential and/or commercial real estate listings) that are for sale. VA server 115 may be configured to request to and receive from the at least one real estate listing computing device and/or at least one real estate listing database listings of real estate properties that are for sale. VA server 115 may be also configured to perform a look up in the listings for the real estate property (e.g., home) associated with the home loan application.

Once application template 1000 is complete as illustrated, for example, in completed application 1100 in FIG. 11, VA server 115 is configured to use the data inputted in completed application template 1100 and generate a report, such as a virtual/online loan application that may provide terms and conditions of such loan, including an interest rate. VA server 115 then transmits the report to user computing device 110 for display.

Exemplary Claim Submission Application Template

FIGS. 12 and 13 depict exemplary configurations of application templates 1200 and 1300, such as claim submission application templates. In the exemplary embodiment, application template 1200 may be stored in VA database 120 (shown in FIG. 1). Application template 1200 may be associated with application type identifiers 214 and 222 (shown in FIG. 2). In the exemplary embodiment, after VA server 115 (shown in FIG. 1) has launched a speech version of an application, VA server 115 receives from user computing device 110 (show in n FIG. 1) a request from an applicant to fill out a particular application, such as an insurance claim submission application for insurance coverage for personal injury and/or property damage (e.g., insurance coverage for at least a vehicle, home, business, and/or personal damage). For example, the insurance claim submission application may be for at least one of automobile, homeowners, life, personal articles, commercial, workers compensation, disability, renters, pet, and travel insurance.

More specifically, VA server 115 transmits to user computing device 110 application data including a first descriptor phrase, such as descriptor phrase 1201 and a blank data field, such as blank data field 1202. The descriptor phrase may also be referred to as a template phrase. Each descriptor phrase includes pre-populated data fields included in application template 1200.

Descriptor phrase 1201 is associated with blank data field 1202. A descriptor phrase identifier and a blank data field identifier may link descriptor phrase 1201 to blank data field 1202. Descriptor phrase 1201 and blank data field 1202 may include phrases, such as leading sentences.

In one example, the leading sentence may include the following text: "I would like to submit a claim for my _____." In response to receiving the application data, user computing device 110 displays the text to the applicant and receives the digital data including the registration data (e.g., second set of digital sound data) from the applicant. For example, user computing device 110 may capture a sentence, such as "I would like to submit a claim for my vehicle." User computing device 110 may transmit the sentence to VA server 115.

VA server 115 may then translate the sentence to text, parse the text, and recognize the populated data in the original blank data field (e.g., vehicle). VA server 115 is configured to use the populated data to retrieve from VA database 120 an application template corresponding to the populated data. In this case, VA server 115 retrieves application template 1200 which corresponds to a claim submission application. VA server 115 may also store the descriptor phrase and populated data into VA database 120.

Once VA server 115 retrieves application template 1200, VA server 115 transmits the application data associated with application template 1200 to user computing device 110. User computing device 110 displays the application data to the applicant. Continuing with the example above, the applicant reads aloud a sentence included in descriptor phrase 1203 and blank data field 1204, and descriptor phrase 1205 and blank data field 1206. In this example, the applicant reads aloud: "My name is JohnSmith and my policy number is 123456789."

User computing device 110 captures the sentence and transmits the sentence in the form of registration data to VA server 115. VA server 115 translates the sentence to text, parses the text, and recognizes the populated data in the original blank data fields (e.g., John Smith and 123456789). Based upon the descriptor phrase, VA server 115 stores the populated data within VA database 120. For example, VA server 115 associates second descriptor phrase 1203 with data in original blank data field 1204 and stores descriptor phrase 1203 along with the data in original blank data field 1204.

In the exemplary embodiment, VA server 115 is configured to transmit the populated sentence (e.g., the sentence including the translated text) to user computing device 110, which displays it to the applicant. The applicant then may verify that the inputted data is correct by transmitting to the VA server 115, using the user computing device, a confirmation that the inputted data is correct. In other embodiments, user computing device 110 may populate the sentence prior to transmitting the registration data to VA server 115.

In the exemplary embodiment, VA server 115 may be configured to dynamically retrieve and/or skip descriptor phrases. In the current example, the applicant is submitting an insurance claim for a vehicle. VA server 115 is configured to retrieve from VA database 120 descriptor phrases corresponding to multiple vehicles and drivers. For example, descriptor phrase 1207 is associated with blank data field 1208 and requests information for the time and date of the incident related with the insurance claim, whereas descriptor phrase 1209 is associated with blank data field 1210 and requests information for the driver(s) involved in the incident.

VA server may skip a descriptor phrase when some information does not apply to the applicant. For example, if the applicant was the sole driver involved in the incident, VA server 115 may skip the descriptor phrase 1211 which requests the information of additional drivers involved in the incident.

Once application template 1200 is complete as illustrated, for example, in completed application template 1300 in FIG. 13, VA server 115 is configured to use the data inputted in completed application template 1300 and generate a report, such as an insurance claim submission summary report. VA server 115 may use the data inputted in completed application template 1300 to calculate, for example, costs corresponding to the insurance claim submission application, such as a total cost of the submitted claim, a deductible cost, and/or other costs that VA server 115 may require to complete the insurance claim submission application. VA server 115 then transmits the report to user computing device 110 for display.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant digital sound data for processing verbally inputted data into applications.

In one embodiment, a processing element may be trained by providing it with a large sample of digital sound data with known characteristics or features. Such information may include, for example, voice analysis of an applicant's voice parameters and information corresponding to the applicant's quote application.

Based upon these analyses, the processing element may learn how to identify characteristics and patterns that may then be applied to analyzing sensor data, voice data, mobile device data, and/or other data. For example, the processing element may learn, when the applicant's voice has met a predefined threshold in the past, to identify the applicant and allow the applicant to automatically access the voice-based application without the need of requesting a sample voice from the applicant. As a result, at the time the applicant accesses the VA server, the VA server may provide quick and automatic access to the voice-based application to prevent the applicant from being negatively impacted by lengthy and potentially annoying sample voice procedures (e.g., providing multiple voice samples).

Exemplary Voice Analysis System

In one aspect, a voice analysis (VA) computer system for processing verbally inputted data into online applications using digital sound data may be provided. The VA computer system may include a host server and a voice analysis (VA) server, and the VA server may include at least one processor in communication with a memory. The VA computer system may be configured to: (1) receive, from a user computing device, a first set of digital sound data in connection with a request to process an online application for an applicant; (2) enable a voice-input tool on the user computing device for the applicant to input registration data into the online application, the registration data included in a second set of digital sound data; (3) retrieve a text-based template based upon a portion of the registration data, the text-based template including descriptor phrases and blank data fields, each descriptor phrase linked to a blank data field, each descriptor phrase requesting registration data from the applicant for populating the blank data fields; (4) receive the registration data as the second set of digital sound data from the applicant via the voice-input tool; (5) translate the second set of digital sound data into text inputs, the text inputs including the descriptor phrases and responses for populating each blank data field; and/or (6) store within a database, each descriptor phrase linked to the corresponding response associated therewith. The VA computer system may include additional, less, or alternate functionality, including that discussed elsewhere herein.

For instance, the VA computer system may be configured to match a plurality of voice parameters in the first set of digital sound data to a sample voice file to determine whether the plurality of voice parameters meets a predefined threshold. The VA computer system may be configured to: parse the first set of digital sound data to identify a plurality of voice parameters of the applicant; and perform a look up, within one or more translation modules, for a sample voice file matching the plurality of voice parameters. The system may be configured to retrieve the text-based template by receiving, from the user computing device, an application type read aloud (e.g., verbally spoken) by the applicant in response to a first leading sentence retrieved by the VA computer system.

In certain embodiments, the VA computer system may be configured to: receive, from the user computing device, a request to process an online insurance application for the applicant, wherein the online insurance application is for at least one of automobile, homeowners, life, health, personal articles, commercial, travel, workers compensation, disability, renters insurance, personal injury, property damage, or pet insurance; and calculate, upon translation of the second set of digital sound data into text inputs, a price quote, premium, or discount for an insurance policy based upon the registration data provided by the applicant. The quote or premium may be a usage-based insurance (UBI) quote or premium.

In other embodiments, the VA computer system may be configured to: receive, from the user computing device, a request to process an online loan application for the applicant, wherein the online loan application is for at least one of a vehicle, home, business, or personal loan; and calculate, upon translation of the second set of digital sound data into text inputs, an interest rate quote, or other loan quote, for the online loan based upon the registration data provided by the applicant.

In some embodiments, the VA computer system may be configured to: transmit at least one descriptor phrase to the user computing device; and/or instruct the user computing device to display the at least one descriptor phrase. The VA computer system may be further configured to receive a confirmation from the user computing device, wherein the confirmation verifies that the populated blank data fields include correct data. The VA computer system may be further configured to: generate a report using data included in the populated blank data fields; and transmit the report to the user computing device.

In another aspect, a computer-implemented method for performing voice analysis on data verbally inputted by a user as part of a registration process may be provided. The method may be implemented using a voice analysis (VA) computer system that includes a voice analysis (VA) server and a host server. Each server may include a processor in communication with a memory. The computer-implemented method may include receiving, from a user computing device, a first set of digital sound data in connection with a request to process an online application for an applicant. The computer-implemented method may further include enabling a voice-input tool on the user computing device for the applicant to input registration data into the online application, wherein the registration data is included in a second set of digital sound data. The computer-implemented method may also include retrieving a text-based template based upon a portion of the registration data, wherein the text-based template includes descriptor phrases and blank data fields, and each descriptor phrase is linked to a blank data field, and each descriptor phrase requests registration data from the applicant for populating the blank data fields. The computer-implemented method may further include receiving the registration data as the second set of digital sound data from the applicant via the voice-input tool. The computer-implemented method may also include translating the second set of digital sound data into text inputs, wherein the text inputs include the descriptor phrases and responses for each blank data field; and/or (6) storing within a database each descriptor phrase linked to the corresponding response associated therewith. The computer-implemented method may include additional, less, or alternate actions, including those discussed elsewhere herein, and may be implemented via one or more local or remote processors.

In further embodiments, the computer-implemented method may also include matching a plurality of voice parameters in the first set of digital sound data to a sample voice file to determine whether the plurality of voice parameters meets a predefined threshold. In other embodiments, the computer-implemented method may also include (i) transmitting at least one descriptor phrase to the user computing device and (ii) instructing the user computing device to display the at least one descriptor phrase. In other embodiments, the computer-implemented method may also include receiving, from the user computing device, a confirmation that verifies that the populated blank data fields include correct data. In further embodiments, the computer-implemented method may also include (i) generating a report using data included in the populated blank data fields, and (ii) transmitting the report to the user computing device.

In yet another aspect, at least one non-transitory computer-readable storage media having computer-executable instructions embodied thereon may be provided. When the computer-executable instructions are executed by a voice analysis (VA) computer system that includes at least one processor in communication with a memory, the computer-executable instructions may cause the at least one processor to (1) receive, from a user computing device, a first set of digital sound data in connection with a request to process an online application for an applicant, and (2) enable a voice-input tool on the user computing device for the applicant to input registration data into the online application, wherein the registration data is included in a second set of digital sound data. The computer-executable instructions may also cause the at least one processor to (3) retrieve a text-based template based upon a portion of the registration data, wherein the text-based template includes descriptor phrases and blank data fields, and each descriptor phrase is linked to a blank data field, and each descriptor phrase requests registration data from the applicant for populating the blank data fields. The computer-executable instructions may also cause the at least one processor to (4) receive the registration data as the second set of digital sound data from the applicant via the voice-input tool; (5) translate the second set of digital sound data into text inputs, wherein the text inputs includes the descriptor phrases and responses for each blank data field, and/or (6) store within a database each descriptor phrase linked to the corresponding response associated therewith. The instructions may direct additional, less, or alternate functionality, including that discussed elsewhere herein.

In further embodiments, the computer-executable instructions may also cause the at least one processor to match a plurality of voice parameters in the first set of digital sound data to a sample voice file to determine whether the plurality of voice parameters meets a predefined threshold. In other embodiments, the computer-executable instructions may also cause the at least one processor to receive, from the user computing device, a request to process an online insurance application for the applicant, wherein the online insurance application is for at least one of automobile, homeowners, personal injury, and property damage insurance; and calculate, upon translation of the second set of digital sound data into text inputs, a price quote, premium, or discount for an insurance policy based upon the registration data provided by the applicant.

In yet other embodiments, the computer-executable instructions may also cause the at least one processor to receive, from the user computing device, a request to process an online loan application for the applicant, wherein the online loan application is for at least one of a vehicle, home, business, or personal loan; and calculate, upon translation of the second set of digital sound data into text inputs, an interest rate quote for the online loan application based upon the registration data provided by the applicant. In further embodiments, the computer-executable instructions may also cause the at least one processor to transmit at least one descriptor phrase to the user computing device, and instruct the user computing device to display the at least one descriptor phrase. In other embodiments, the computer-executable instructions may also cause the at least one processor to receive, from the user computing device, a confirmation verifying that the populated blank data fields include correct data. In other embodiments, the computer-executable instructions may also cause the at least one processor to generate a report using data included in the populated blank data fields; and transmit the report to the user computing device.

In another aspect, a voice analysis (VA) computer system for processing verbally inputted data into an online claim submission application using digital sound data may be provided. The VA computer system may include a host server and a voice analysis (VA) server. Each server may include at least one processor in communication with a memory. The VA computer system may be configured to: (1) receive, from a user computing device, a first set of digital sound data in connection with a request to submit a virtual insurance claim for an applicant; (2) enable a voice-input tool on the user computing device for the applicant to input registration data into the online claim submission application, the registration data included in a second set of digital sound data; (3) retrieve a text-based template based upon a portion of the registration data, the text-based template including descriptor phrases and blank data fields, each descriptor phrase linked to a blank data field, each descriptor phrase requesting registration data from the applicant for populating the blank data fields; (4) receive the registration data as the second set of digital sound data from the applicant via the voice-input tool; (5) translate the second set of digital sound data into text inputs, the text inputs including the descriptor phrases and responses for populating each blank data field; and/or (6) store within a database, each descriptor phrase linked to the corresponding response associated therewith. The computer system may include additional, less, or alternate functionality, including that discussed elsewhere herein.

In yet other embodiments, the VA computer system may further be configured to match a plurality of voice parameters in the first set of digital sound data to a sample voice file to determine whether the plurality of voice parameters meets a predefined threshold. In some embodiments, the VA computer system may be configured to: parse the first set of digital sound data to identify a plurality of voice parameters of the applicant; and perform a look up, within one or more translation modules, for a sample voice file matching the plurality of voice parameters. In other embodiments, the system may be configured to retrieve the text-based template by receiving, from the user computing device, an application type read aloud (e.g., verbally spoken) by the applicant in response to a first leading sentence retrieved by the VA computer system.

In further embodiments, the VA computer system may be configured to: receive, from the user computing device, a second request to process an online insurance claim submission application for the applicant, wherein the second request is included in the registration data received as the second set of digital sound data, and wherein the online insurance claim submission application is for at least one of automobile, homeowners, personal articles, renters insurance, workers compensation, disability insurance, life, health, or travel insurance; and calculate, upon translation of the second set of digital sound data into text inputs, costs corresponding to the online insurance claim submission application.

In some embodiments, the VA computer system may further be configured to: transmit at least one descriptor phrase to the user computing device; and/or instruct the user computing device to display the at least one descriptor phrase. In other embodiments, the VA computer system may be further configured to receive a confirmation from the user computing device, wherein the confirmation verifies that the populated blank data fields include correct data. In further embodiments, the VA computer system may be configured to: generate a report using data included in the populated blank data fields; and transmit the report to the user computing device.

In yet another aspect, a computer-implemented method for processing verbally inputted data into online claim submission apps using digital sound data may be provided. The method may be implemented using a voice analysis (VA) computer system that includes a voice analysis (VA) server and a host server. Each server may include a processor in communication with a memory. The method may include (1) receiving, from a user computing device, a first set of digital sound data in connection with a request to process an virtual insurance claim for an applicant; and (2) enabling a voice-input tool on the user computing device for the applicant to input registration data into the online claim submission app, wherein the registration data is included in a second set of digital sound data. The method may also include (3) retrieving a text-based template based upon a portion of the registration data, wherein the text-based template includes descriptor phrases and blank data fields, and each descriptor phrase is linked to a blank data field, and each descriptor phrase requests registration data from the applicant for populating the blank data fields. The method may further include (4) receiving the registration data as the second set of digital sound data from the applicant via the voice-input tool; (5) translating the second set of digital sound data into text inputs, wherein the text inputs include the descriptor phrases and responses for populating each blank data field; and/or (6) storing within a database each descriptor phrase linked to the corresponding response associated therewith. The method may include additional, less, or alternate actions, including those discussed elsewhere herein, and may be implemented via one or more local or remote processors.

In further embodiments, the computer-implemented method may further include matching a plurality of voice parameters in the first set of digital sound data to a sample voice file to determine whether the plurality of voice parameters meets a predefined threshold. In some embodiments, the computer-implemented method may further include parsing the first set of digital sound data to identify a plurality of voice parameters of the applicant; and performing a look up, within one or more translation modules, for a sample voice file matching the plurality of voice parameters. In other embodiments, the computer-implemented method may also include retrieving the text-based template by receiving, from the user computing device, an application type verbally spoken by the applicant in response to a first leading sentence retrieved by the VA computer system.

In further embodiments, the computer-implemented method may further include receiving, from the user computing device, a second request to process an online insurance claim submission application for the applicant, wherein the second request is included in the registration data received as the second set of digital sound data, and wherein the online insurance claim submission application is for at least one of automobile, homeowners, personal articles, renters insurance, workers compensation, disability insurance, life, health, or travel insurance; and calculating, upon translation of the second set of digital sound data into text inputs, costs corresponding to the online insurance claim submission application.

In some embodiments, the computer-implemented method may further include: transmitting at least one descriptor phrase to the user computing device; and instructing the user computing device to display the at least one descriptor phrase. In other embodiments, the computer-implemented method may further include receiving a confirmation from the user computing device, wherein the confirmation verifies that the populated blank data fields include correct data. In further embodiments, the computer-implemented method may further include: generating a report using data included in the populated blank data fields; and transmitting the report to the user computing device.

In another aspect, at least one non-transitory computer-readable storage media having computer-executable instructions embodied thereon may be provided. When the computer-executable instructions are executed by a voice analysis (VA) computer system including at least one processor in communication with a memory, the computer-executable instructions may cause the at least one processor to receive, from a user computing device, a first set of digital sound data in connection with a request to submit a virtual insurance claim for an applicant, and enable a voice-input tool on the user computing device for the applicant to input registration data into an online claim submission app, wherein the registration data is included in a second set of digital sound data. The computer-executable instructions may also cause the at least one processor to retrieve a text-based template based upon a portion of the registration data, wherein the text-based template includes descriptor phrases and blank data fields, and each descriptor phrase is linked to a blank data field, and each descriptor phrase requests registration data from the applicant for populating the blank data fields. The computer-executable instructions may further cause the at least one processor to receive the registration data as the second set of digital sound data from the applicant via the voice-input tool, translate the second set of digital sound data into text inputs, wherein the text inputs include the descriptor phrases and responses for populating each blank data field, and store within a database each descriptor phrase linked to the corresponding response associated therewith. The instructions may direct additional, less, or alternate functionality, including that discussed elsewhere herein.

In further embodiments, the computer-executable instructions may also cause the at least one processor to match a plurality of voice parameters in the first set of digital sound data to a sample voice file to determine whether the plurality of voice parameters meets a predefined threshold. In some embodiments, the computer-executable instructions may also cause the at least one processor to: parse the first set of digital sound data to identify a plurality of voice parameters of the applicant; and perform a look up, within one or more translation modules, for a sample voice file matching the plurality of voice parameters. In other embodiments, the computer-executable instructions may cause the at least one processor to retrieve the text-based template by receiving, from the user computing device, an application type verbally spoken by the applicant in response to a first leading sentence retrieved by the VA computer system.

In further embodiments, the computer-executable instructions may also cause the at least one processor to: receive, from the user computing device, a second request to process an online insurance claim submission application for the applicant, wherein the second request is included in the registration data received as the second set of digital sound data, and wherein the online insurance claim submission application is for at least one of automobile, homeowners, personal articles, renters insurance, workers compensation, disability insurance, life, health, or travel insurance; and calculate, upon translation of the second set of digital sound data into text inputs, costs corresponding to the online insurance claim submission application.

In some embodiments, the computer-executable instructions may cause the at least one processor to: transmit at least one descriptor phrase to the user computing device; and/or instruct the user computing device to display the at least one descriptor phrase. In other embodiments, the computer-executable instructions may also cause the at least one processor to receive a confirmation from the user computing device, wherein the confirmation verifies that the populated blank data fields include correct data. In further embodiments, the computer-executable instructions may cause the at least one processor to: generate a report using data included in the populated blank data fields; and transmit the report to the user computing device.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, artificial intelligence (AI) chips, graphics processing unit (GPU) chips, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A voice analysis (VA) computer system for processing verbally inputted data into online applications using digital sound data, the VA computer system comprising a host server and a voice analysis (VA) server, the VA server comprising at least one processor in communication with a memory, wherein the VA computer system is configured to:
   store within a database, a plurality of translation modules, each translation module of the plurality of translation modules including a different speech pattern;
   receive, from a user computing device, a first set of digital sound data in connection with a request to process an online application for an applicant, the first set of digital sound data provided by the applicant and including a test calibration phrase;
   enable a voice-input tool on the user computing device for the applicant to input registration data into the online application, the registration data included in a second set of digital sound data;
   compare the test calibration phrase of the first set of digital sound data to the speech patterns of the plurality of translation modules to select a translation module of the plurality of translation modules for translating the registration data;
   retrieve a text-based template based upon a portion of the registration data, the text-based template including descriptor phrases and blank data fields, each descriptor phrase linked to a blank data field, each descriptor phrase requesting registration data from the applicant for populating the blank data fields;
   receive the registration data as the second set of digital sound data from the applicant via the voice-input tool;
   translate the second set of digital sound data into text inputs using the translation module, the text inputs including the descriptor phrases and responses for populating each blank data field;
   store within the database, each descriptor phrase linked to the corresponding response associated therewith;
   complete the online application by populating each blank data field with the corresponding translated text inputs; and
   generate a report for the applicant using the completed online application.

2. The VA computer system of claim 1 further configured to match a plurality of voice parameters in the first set of digital sound data to a sample voice file of the translation modules to determine whether the plurality of voice parameters meets a predefined threshold.

3. The VA computer system of claim 1 further configured to:
   parse the first set of digital sound data to identify a plurality of voice parameters of the applicant; and
   perform a look up, within the plurality of translation modules, for a sample voice file matching the plurality of voice parameters.

4. The VA computer system of claim 1 further configured to retrieve the text-based template by receiving, from the user computing device, an application type verbally spoken by the applicant in response to a first leading sentence retrieved by the VA computer system.

5. The VA computer system of claim 4 further configured to:
   receive, from the user computing device, a request to process an online insurance application for the applicant, wherein the online insurance application is for at least one of automobile insurance and homeowners insurance; and
   calculate, upon translation of the second set of digital sound data into text inputs, a price quote for an insurance policy based upon the registration data provided by the applicant.

6. The VA computer system of claim 4 further configured to:
   receive, from the user computing device, a request to process an online loan application for the applicant, wherein the online loan application is for at least one of a vehicle, home, business, or personal loan; and
   calculate, upon translation of the second set of digital sound data into text inputs, an interest rate quote for the online loan application based upon the registration data provided by the applicant.

7. The VA computer system of claim 4 further configured to:
   receive, from the user computing device, a request to process an insurance claim submission application, wherein the insurance claim submission app is for at least one of personal injury and property damage insurance coverage; and
   calculate, upon translation of the second set of digital sound data into text inputs, costs corresponding to the insurance claim submission application.

8. The VA computer system of claim 4 further configured to:
   receive, from the user computing device, a request to process an online insurance application for the applicant, wherein the online insurance application is for at least one of life and health insurance; and
   calculate, upon translation of the second set of digital sound data into text inputs, a price quote for an insurance policy based upon the registration data provided by the applicant.

9. The VA computer system of claim 1 further configured to:
   transmit at least one descriptor phrase to the user computing device; and
   instruct the user computing device to display the at least one descriptor phrase.

10. The VA computer system of claim 1 further configured to receive a confirmation from the user computing device, wherein the confirmation verifies that the populated blank data fields include correct data.

11. The VA computer system of claim 1 further configured to:
    generate the report using data included in the populated blank data fields of the completed online application; and
    transmit the report to the user computing device.

12. A computer-implemented method for processing verbally inputted data into online applications using digital sound data, the method implemented using a voice analysis (VA) computer system including a voice analysis (VA) server and a host server, each server including a processor in communication with a memory, the method comprising:
    storing within a database, a plurality of translation modules, each translation module of the plurality of translation modules including a different speech pattern;
    receiving, from a user computing device, a first set of digital sound data in connection with a request to process an online application for an applicant, the first set of digital sound data provided by the applicant and including a test calibration phrase;

enabling a voice-input tool on the user computing device for the applicant to input registration data into the online application, the registration data included in a second set of digital sound data;

comparing the test calibration phrase of the first set of digital sound data to the speech patterns of the plurality of translation modules to select a translation module of the plurality of translation modules for translating the registration data;

retrieving a text-based template based upon a portion of the registration data, the text-based template including descriptor phrases and blank data fields, each descriptor phrase linked to a blank data field, each descriptor phrase requesting registration data from the applicant for populating the blank data fields;

receiving the registration data as the second set of digital sound data from the applicant via the voice-input tool;

translating the second set of digital sound data into text inputs using the translation module, the text inputs including the descriptor phrases and responses for populating each blank data field;

storing within the database, each descriptor phrase linked to the corresponding response associated therewith completing the online application by populating each blank data field with the corresponding translated text inputs; and generating a report for the applicant using the completed online application.

13. The computer-implemented method of claim 12 further comprising:

parsing the first set of digital sound data to identify a plurality of voice parameters of the applicant; and performing a look up, within the plurality of translation modules, for a sample voice file matching the plurality of voice parameters.

14. The computer-implemented method of claim 12 further comprising retrieving the text-based template by receiving, from the user computing device, an application type verbally spoken by the applicant in response to a first leading sentence retrieved by the VA computer system.

15. The computer-implemented method of claim 12 further comprising:

receiving, from the user computing device, a request to process an online insurance application for the applicant, wherein the online insurance application is for at least one of automobile insurance and homeowners insurance; and calculating, upon translation of the second set of digital sound data into text inputs, a price quote for an insurance policy based upon the registration data provided by the applicant.

16. The computer-implemented method of claim 12 further comprising:

receiving, from the user computing device, a request to process an online loan application for the applicant, wherein the online loan application is for at least one of a vehicle, home, business, or personal loan; and calculating, upon translation of the second set of digital sound data into text inputs, an interest rate quote for the online loan application based upon the registration data provided by the applicant.

17. The computer-implemented method of claim 12 further comprising:

receiving, from the user computing device, a request to process an insurance claim submission application, wherein the insurance claim submission application is for at least one of personal injury and property damage insurance coverage; and calculating, upon translation of the second set of digital sound data into text inputs, costs corresponding to the insurance claim submission application.

18. At least one non-transitory computer-readable storage media having computer-executable instructions embodied thereon, wherein when executed by voice analysis (VA) computer system including at least one processor in communication with a memory, the computer-executable instructions cause the at least one processor to:

store within a database, a plurality of translation modules, each translation module of the plurality of translation modules including a different speech pattern;

receive, from a user computing device, a first set of digital sound data in connection with a request to process an online application for an applicant, the first set of digital sound data provided by the applicant and including a test calibration phrase;

enable a voice-input tool on the user computing device for the applicant to input registration data into the online application, the registration data included in a second set of digital sound data;

compare the test calibration phrase of the first set of digital sound data to the speech patterns of the plurality of translation modules to select a translation module of the plurality of translation modules for translating the registration data;

retrieve a text-based template based upon a portion of the registration data, the text-based template including descriptor phrases and blank data fields, each descriptor phrase linked to a blank data field, each descriptor phrase requesting registration data from the applicant for populating the blank data fields;

receive the registration data as the second set of digital sound data from the applicant via the voice-input tool;

translate the second set of digital sound data into text inputs using the translation module, the text inputs including the descriptor phrases and responses for populating each blank data field;

store within the database, each descriptor phrase linked to the corresponding response associated therewith complete the online application by populating each blank data field with the corresponding translated text inputs; and generate a report for the applicant using the completed online application.

19. The at least one non-transitory computer-readable storage media of claim 18, wherein the computer-executable instructions further cause the at least one processor to:

parse the first set of digital sound data to identify a plurality of voice parameters of the applicant; and perform a look up, within the plurality of translation modules, for a sample voice file matching the plurality of voice parameters.

20. The at least one non-transitory computer-readable storage media of claim 18, wherein the computer-executable instructions further cause the at least one processor to retrieve the text-based template by receiving, from the user computing device, an application type verbally spoken by the applicant in response to a first leading sentence retrieved by the VA computer system.

* * * * *